US012802719B2

(12) United States Patent
Kondo

(10) Patent No.: US 12,802,719 B2
(45) Date of Patent: Nov. 17, 2026

(54) DISK DEVICE AND DISK DEVICE CONTROL METHOD

(71) Applicants: KABUSHIKI KAISHA TOSHIBA, Tokyo (JP); TOSHIBA ELECTRONIC DEVICES & STORAGE CORPORATION, Tokyo (JP)

(72) Inventor: Masayuki Kondo, Yokohama Kanagawa (JP)

(73) Assignees: Kabushiki Kaisha Toshiba, Kawasaki (JP); Toshiba Electronic Devices & Storage Corporation, Kawasaki (JP)

( * ) Notice: Subject to any disclaimer, the term of this patent is extended or adjusted under 35 U.S.C. 154(b) by 0 days.

(21) Appl. No.: 18/925,917

(22) Filed: Oct. 24, 2024

(65) Prior Publication Data

US 2025/0342858 A1 Nov. 6, 2025

(30) Foreign Application Priority Data

May 1, 2024 (JP) ................................ 2024-074361

(51) Int. Cl.
*G11B 20/10* (2006.01)
*G11B 5/012* (2006.01)
*G11B 5/60* (2006.01)

(52) U.S. Cl.
CPC ........ *G11B 20/10398* (2013.01); *G11B 5/012* (2013.01); *G11B 5/607* (2013.01)

(58) Field of Classification Search
CPC ..... G11B 2005/0021; G11B 5/00; G11B 5/09; G11B 27/36; G11B 7/125
USPC ............................................................ 360/75
See application file for complete search history.

(56) References Cited

U.S. PATENT DOCUMENTS

| | | | | |
|---|---|---|---|---|
| 6,816,344 | B2 | 11/2004 | Tsuchiya | |
| 7,457,071 | B1 * | 11/2008 | Sheh | G11B 5/596 360/48 |
| 9,401,161 | B1 | 7/2016 | Jury et al. | |
| 9,548,068 | B1 * | 1/2017 | Rausch | G11B 5/59627 |
| 9,576,597 | B2 | 2/2017 | Trantham et al. | |
| 2015/0255092 | A1 | 9/2015 | Macken et al. | |

* cited by examiner

*Primary Examiner* — Nabil Z Hindi
(74) *Attorney, Agent, or Firm* — Knobbe, Martens, Olson & Bear, LLP

(57) ABSTRACT

According to one embodiment, a disk device includes a disk medium, a head, and a controller. The disk medium includes a recording surface. The head includes a first read element and a heater. The first read element faces the recording surface. The controller is configured to detect a first noise during heating of the head, in response to a signal read from the disk medium by the first read element when starting supply of an electric power to the heater.

18 Claims, 23 Drawing Sheets

DISK DEVICE AND DISK DEVICE CONTROL METHOD

CROSS-REFERENCE TO RELATED APPLICATIONS

This application is based upon and claims the benefit of priority from Japanese Patent Application No. 2024-074361, filed on May 1, 2024; the entire contents of which are incorporated herein by reference.

FIELD

Embodiments described herein relate generally to a disk device and a disk device control method.

BACKGROUND

In a disk device that includes a disk medium and a head, while the head is made floating above the disk medium, the information recorded on the disk medium is read by the head. In the disk device, the head is equipped with a heater, which is to be supplied with an electric power to adjust the protrusion amount of the head due to thermal expansion and to control the flying height of the head above the disk medium. At this time, it is desirable to properly control the flying height of the head from the disk medium.

DETAILED DESCRIPTION

In general, according to one embodiment, there is provided a disk device including a disk, a head and a controller. The disk medium includes a recording surface. The head includes a first read element facing the recording surface, and a heater. The controller is configured to detect a first noise during heating of the head, in response to a signal read from the disk medium by the first read element when starting supply of an electric power to the heater.

Exemplary embodiments of a disk device will be explained below in detail with reference to the accompanying drawings. The present invention is not limited to the following embodiments.

Embodiment

In a disk device according to an embodiment, the head is equipped with a heater, which is to be supplied with an electric power to adjust the protrusion amount of the head due to thermal expansion and to control the flying height of the head above the disk medium. Here, the disk device has been improved to properly control this flying height.

Figure 1:
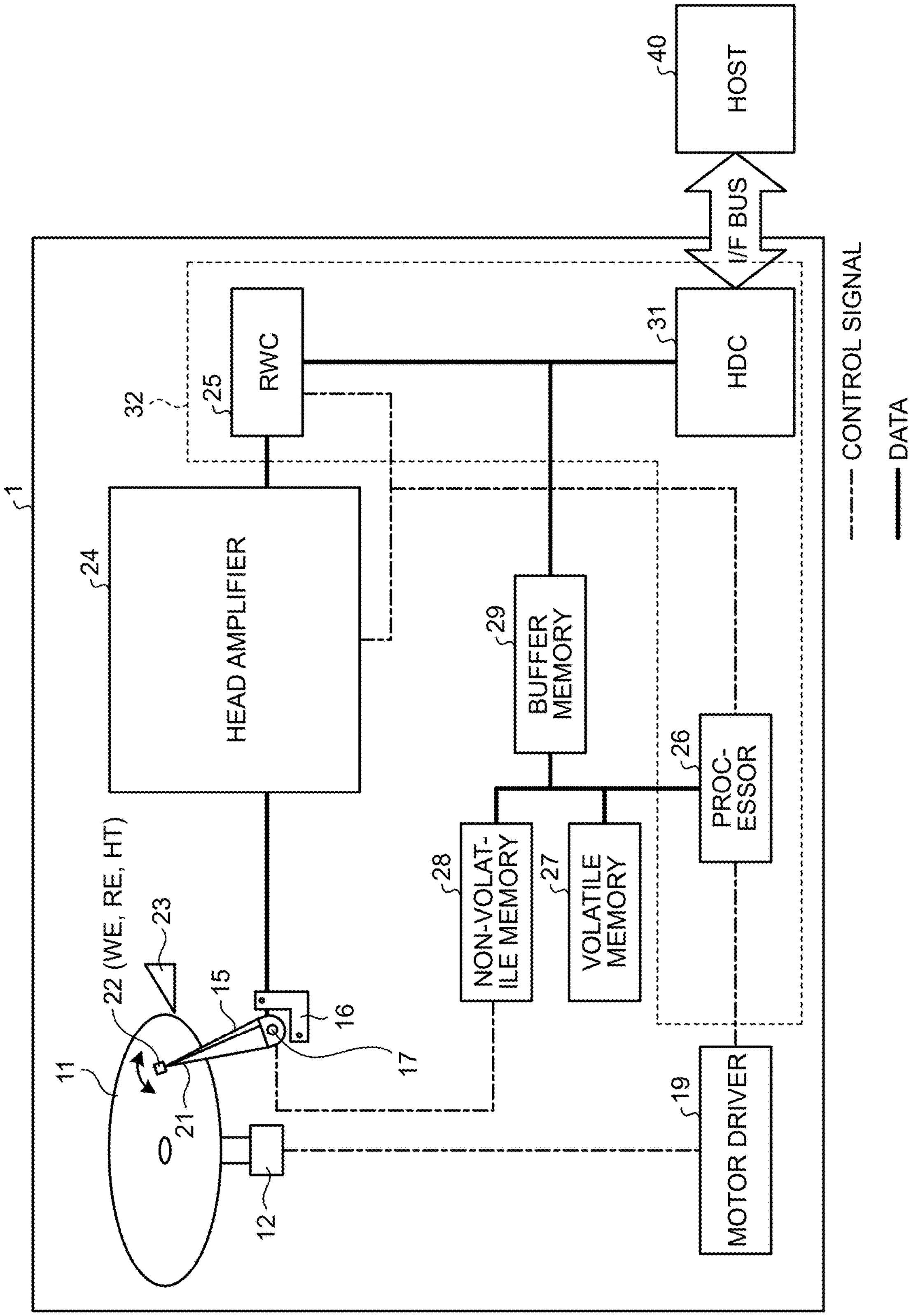
FIG. 1 is a diagram illustrating a configuration of a disk device according to an embodiment.

The disk device 1 may be configured as illustrated in FIG. 1. FIG. 1 is a diagram illustrating a configuration of the disk device 1.

The disk device 1 is, for example, a hard disk drive, and functions as an external storage device for a host 40.

The disk device 1 includes a disk medium 11, a spindle motor 12, a head slider 21, a head 22, an actuator arm 15, a voice coil motor (VCM) 16, a ramp 23, a head amplifier 24, a motor driver 19, a volatile memory 27, a non-volatile memory 28, a buffer memory 29, and a controller 32. The disk medium 11, spindle motor 12, head 22, actuator arm 15, voice coil motor (VCM) 16, and ramp 23 are accommodated in a housing (not illustrated). The head amplifier 24, motor driver 19, volatile memory 27, non-volatile memory 28, buffer memory 29, and controller 32 are partially accommodated in the housing, and partially arranged at their other portions on a board (outside the housing).

The controller 32 includes a read/write channel (RWC) 25, a hard disk controller (HDC) 31, and a processor 26. The processor 26 may be a CPU.

Here, the package of the head amplifier 24 may be mounted on a board that is fixed to the actuator arm 15. The controller 32 may be configured as a single chip integrated circuit (system-on-chip). The package of the controller 32 may be mounted on a printed board outside the housing.

The disk medium 11 is a disc-shaped recording medium that magnetically records various types of information, and is rotated by the spindle motor 12. The disk medium 11 has a plurality of tracks TR, which are concentric and centered near the rotational center of the spindle motor 12, on its recording surface 11*a* (see FIG. 4). Each of the tracks TR is provided with a plurality of data areas DT and servo areas SV arranged alternately in the circumferential direction (see FIG. 18). In each track TR, the plurality of servo areas SV may be arranged at substantially equal intervals in the circumferential direction.

The actuator arm 15 is attached to a pivot 17 to be rotatable freely. The head 22 is attached to one end of this actuator arm 15 via the head slider 21. The head 22 may be placed near the tip of the head slider 21 (see FIGS. 2 and 3). The VCM 16 is connected to the other end of the actuator arm 15. The VCM 16 rotates the actuator arm 15 around the pivot 17, and positions the head 22 in a floating state above an arbitrary radial position of the disk medium 11. At this time, the processor 26 performs servo control (positioning control) for the positioning of the head 22 by using servo information, which is read from the servo area SV by a read element RE in the head 22.

The motor driver 19 drives the spindle motor 12 in response to commands from the processor 26, and rotates the disk medium 11 around the rotational axis at a specified number of revolutions. Further, the motor driver 19 drives the VCM 16 in response to commands from the processor 26, and moves the head 22, which is at one end of the actuator arm 15, in the radial direction of the disk medium 11.

Figures 2A, 2B:
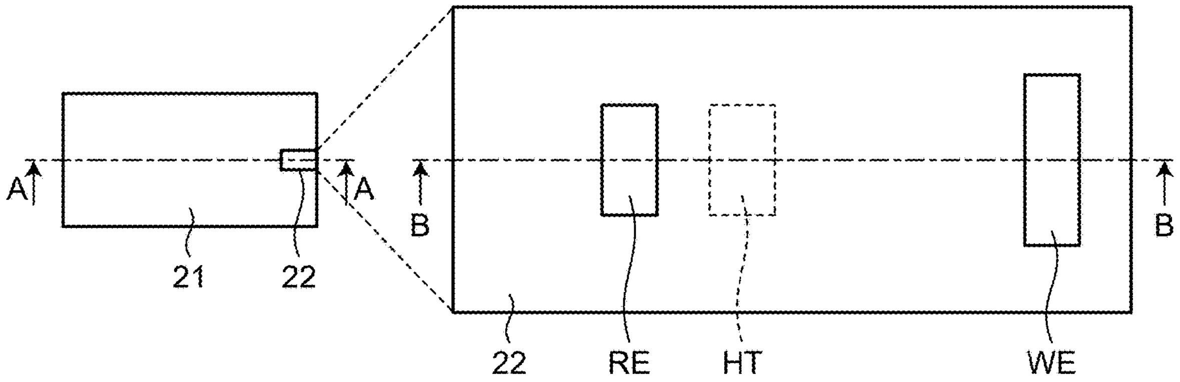
FIGS. 2A and 2B are plan views each illustrating a configuration of a head in the embodiment.
Figures 3A, 3B:
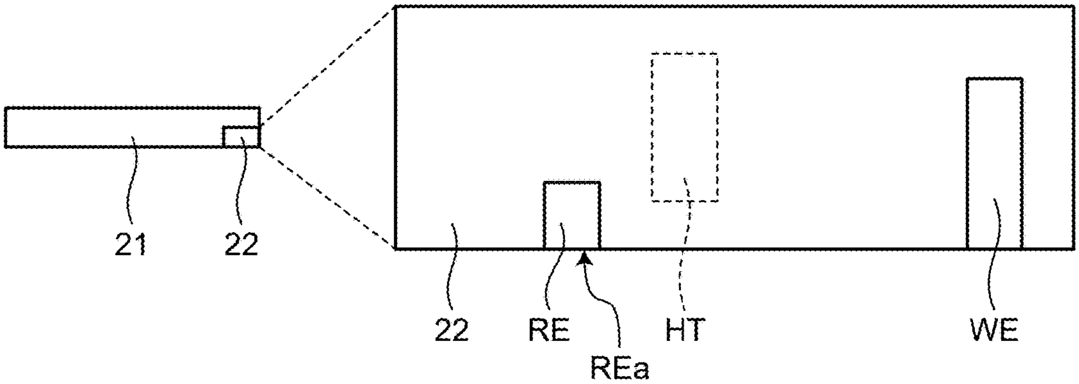
FIGS. 3A and 3B are sectional views each illustrating a configuration of the head in the embodiment.

The head 22 is configured to write user data to the disk medium 11 and to read information (user data and servo information) recorded in the disk medium 11. The head 22 is configured as illustrated in FIGS. 2A, 2B, 3A, and 3B, for example. FIGS. 2A and 2B are plan views each illustrating a configuration of the head 22. FIG. 2A is a plan view illustrating the arrangement of the head 22 on the head slider 21. FIG. 2B is an enlarged plan view illustrating the configuration inside the head 22. FIG. 3A and FIG. 3B are sectional views each illustrating a configuration of the head 22. FIG. 3A is a sectional view illustrating the arrangement of the head 22 on the head slider 21, which illustrates a cross section taken along a line A-A in FIG. 2A. FIG. 3B is an enlarged sectional view illustrating the configuration inside the head 22, which illustrates a cross section taken along a line B-B in FIG. 2B.

As illustrated in FIGS. 2A, 2B, 3A, and 3B, the head 22 has a formation provided with a write element WE, a read element RE, and a heater HT. The write element WE, read element RE, and heater HT may be arranged along the longitudinal direction of the head 22. The write element WE may be arranged closer to the tip side of the head 22 than the read element RE.

Figures 4A, 4B, 4C:
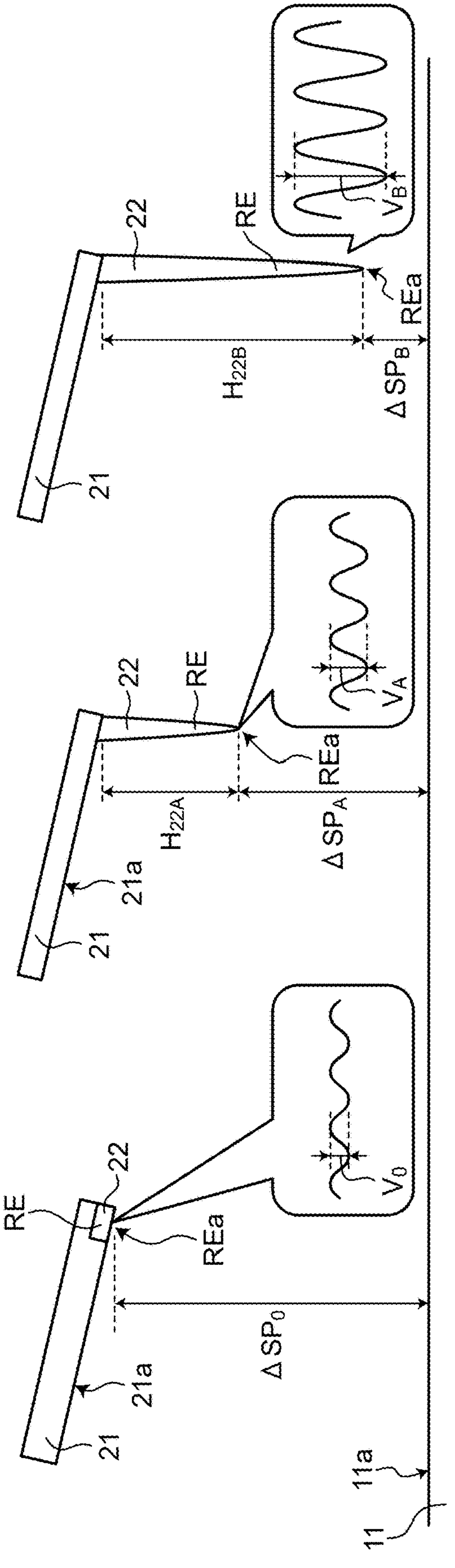
FIGS. 4A to 4C are diagrams illustrating changes in the protrusion amount of the head due to thermal expansion in the embodiment.

The write element WE faces the recording surface 11*a* of the disk medium 11 (see FIG. 4A). The write element WE writes data to the data areas DT of each track TR of the recording surface 11*a* by using the magnetic field generated by its magnetic pole. The read element RE faces the recording surface 11*a* of the disk medium 11. It is assumed that the surface of the read element RE that faces the recording surface 11*a* will be referred to as facing surface REa. The read element RE reads changes in the magnetic field on the disk medium 11 as information, and thereby reads user data from the data areas DT of each track TR of the recording surface 11*a*, or thereby reads servo information from the servo areas SV of each track TR of the recording surface 11*a*. On the other hand, when the disk medium 11 is stopped rotating, the head 22 is retracted onto the ramp 23 (see FIG. 1).

During the write operation, the head amplifier 24 converts the write signal supplied from the RWC 25 into a write current and outputs this current to the write element WE.

During the read operation, the head amplifier 24 amplifies the signal (read signal) read by the read element RE from the disk medium 11, and outputs this signal to the RWC 25. At this time, the processor 26 performs control to have a bias current conducted from the head amplifier 24 to the read element RE. The RWC 25 further amplifies the signal from the head amplifier 24. The RWC 25 performs control of Auto Gain Control (AGC), and thereby amplifies the read signal with the gain determined by the processor 26, to make the signal level become a target level.

The heater HT may be provided near the read element RE. When energized, the heater HT can cause thermal expansion to the portion near the read element RE.

In the disk device 1, there is a case where, during the read operation, the heater HT is used to perform Dynamic Flying Height (DFH) control. In the DFH control, the processor 26 performs control to supply an electric power from an electric power supply unit 24*e* to the heater HT via a bias circuit 24*a*. That is, as illustrated in FIGS. 4A to 4C, the processor 26 applies a heater power to the heater HT mounted on the head 22, via the head amplifier 24, and thereby causes the head 22 to thermally expand. FIGS. 4A to 4C are diagrams illustrating changes in the protrusion amount of the head 22 due to thermal expansion. The protrusion of the head 22 due to thermal expansion can adjust the distance (spacing ΔSP) from the facing surface REa of the read element RE to the recording surface 11*a* of the disk medium 11.

When the power application to the heater HT is off, as illustrated in FIG. 4A, the height position of the facing surface REa on the head 22 is approximately the same as the height position of the facing surface 21*a* on the head slider 21.

At this time, the flying height of the head 22 from the disk medium 11 is expressed by the spacing ΔSP. It is assumed that the electric power supplied to the heater HT will be referred to as heater power $P_{HT}$. When the power application to the heater HT is off, as the heater power $P_{HT} \approx 0$, the protrusion amount $H_{22}$ of the head 22 due to thermal expansion≈0. As a result, as illustrated in FIG. 4A, the spacing ΔSP becomes relatively large $\Delta SP_0$, and the amplitude of the read voltage by the read element RE becomes relatively small $V_0$.

The head amplifier 24 supplies an electric power to the heater HT under the control of the controller 32. Receiving the electric power supply, the heater HT heats the area of the head 22 near the read element RE. With this heating, since the head 22 is thermally deformed, the spacing ΔSP is changed.

When a heater power $P_{HT} = P_A$ (>0) is supplied to the heater HT, as illustrated in FIG. 4B, the height position of the facing surface REa becomes closer to the recording surface 11*a* than the height position of the facing surface 21*a*.

At this time, as the heater power $P_{HT} \approx P_A$, the protrusion amount $H_{22}$ of the head 22 due to thermal expansion becomes $H_{22A}$ (>0). As a result, as illustrated in FIG. 4B, the spacing ΔSP becomes relatively small $\Delta SP_A$ ($\approx \Delta SP_0 - H_{22A}$), and the amplitude of the read voltage by the read element RE becomes relatively large $V_A$ ($>V_0$).

When a heater power $P_{HT}$=PB (>$P_A$) is supplied to the heater HT, as illustrated in FIG. 4C, the height position of the facing surface REa becomes further closer to the recording surface 11*a* than the height position of the facing surface 21*a*.

At this time, as the heater power $P_{HT}$≈PB, the protrusion amount $H_{22}$ of the head 22 due to thermal expansion becomes $H_{22B}$ (>$H_{22A}$). As a result, as illustrated in FIG. 4C, the spacing ΔSP becomes further smaller $\Delta SP_B$ (≈$\Delta SP_0$−$H_{22B}$), and the amplitude of the read voltage by the read element RE becomes further larger VB (>$V_A$).

The presence or absence of a noise in the read voltage during thermal protrusion can be detected by the following method. Data written at a uniform frequency on the disk medium 11 is prepared in advance during the manufacturing process, and the data is read by the read element RE from immediately after the heater power application. While the thermal protrusion is gradually increased, the read voltage waveform is confirmed for the data read by the read element RE.

The disk device 1 may utilize the Defect Scan function implemented in the RWC 25 as a method for confirming the read voltage waveform. As illustrated in FIGS. 5A to 5D, the Defect Scan function is a function that detects abnormalities in the read voltage waveform as errors, in order to detect projecting portions and defective portions in the disk medium 11. FIGS. 5A to 5D are diagrams illustrating forms of a noise. Under the normal state, when the heater HT is off, the disk device 1 renders, with respect to the data written at a single frequency, a constant amplitude of the read voltage of the read element RE, as illustrated in FIG. 5A. In FIG. 5A, each of the upper limit target value and the lower limit target value is indicated by a dotted line. In the case of FIG. 5A, the read voltage reaches the upper limit target value at timing t100.

Figure 5C:
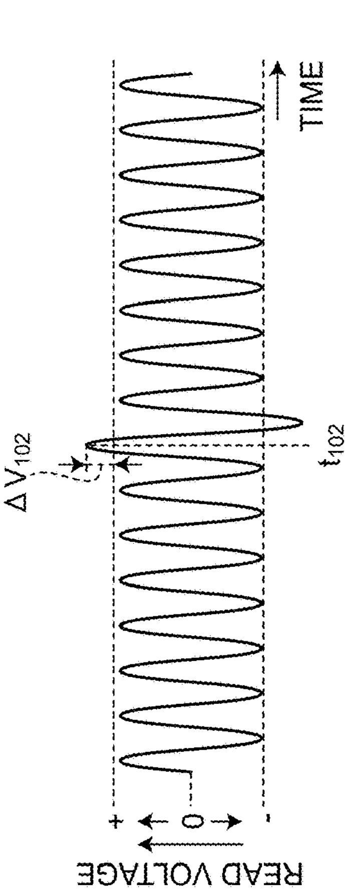
FIGS. 5A to 5D are diagrams illustrating forms of a noise in the embodiment.
Figure 5D:
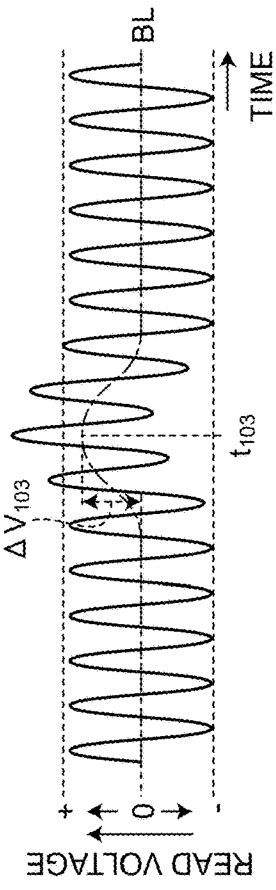
Figure 5A:
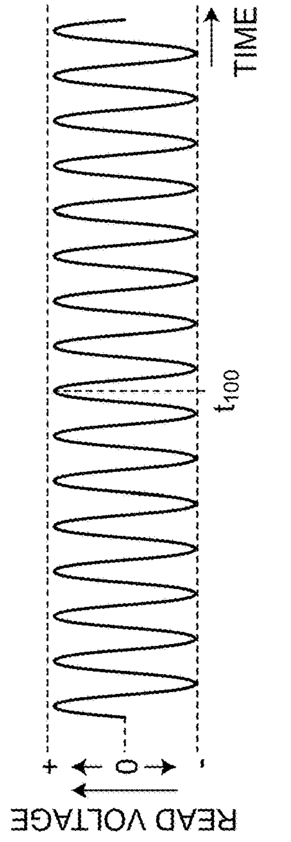
Figure 5B:
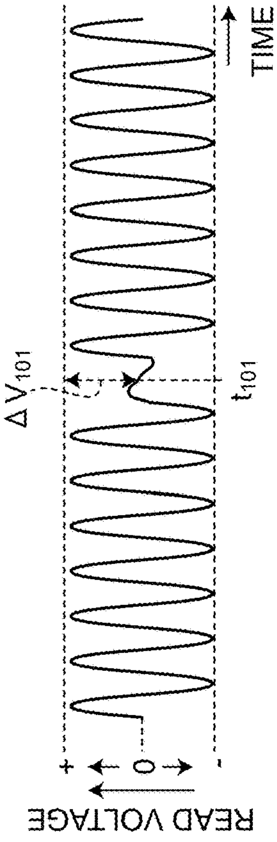

In the Defect Scan function, a sudden output drop in the read voltage waveform, as illustrated in FIG. 5B, can be detected as an error. In the case of FIG. 5B, at timing t101, which corresponds to the timing t100, the read voltage does not reach the upper limit target value. The disk device 1 may detect a sudden output drop in the read voltage waveform when the shortage amount $\Delta V_{101}$ of the read voltage value with respect to the upper limit target value exceeds a threshold TH1.

In the Defect Scan function, a sudden output rise in the read voltage waveform, as illustrated in FIG. 5C, can be detected as an error. In the case of FIG. 5C, at timing t102, which corresponds to the timing t100, the read voltage exceeds the upper limit target value. The disk device 1 may detect a sudden output rise in the read voltage waveform when the excess amount $\Delta V_{102}$ of the read voltage value with respect to the upper limit target value exceeds a threshold TH2.

In the Defect Scan function, a baseline change, as illustrated in FIG. 5D, can be detected as an error. The disk device 1 may obtain a baseline BL as the locus of the average value in one period of the read voltage waveform, as illustrated by a chain line in FIG. 5D. In the case of FIG. 5D, the baseline BL fluctuates significantly from the target value at specified timing t103. The disk device 1 may detect a change in the baseline BL when the fluctuation amount $\Delta V_{103}$ of the baseline BL with respect to the target value exceeds a threshold TH3.

When a read operation is performed from immediately after the heater power application, and the Defect Scan function is utilized, it becomes possible to detect a noise during thermal protrusion. Further, in the Defect Scan function, since the error occurrence position can be identified, it becomes possible for the disk device 1 to detect the timing of noise generation at the start of heater power application, by knowing in advance the timing of the start of the read operation and the timing of the start of heater power application. The disk device 1 may perform this operation for each of all the read elements RE mounted thereon.

Figure 6:
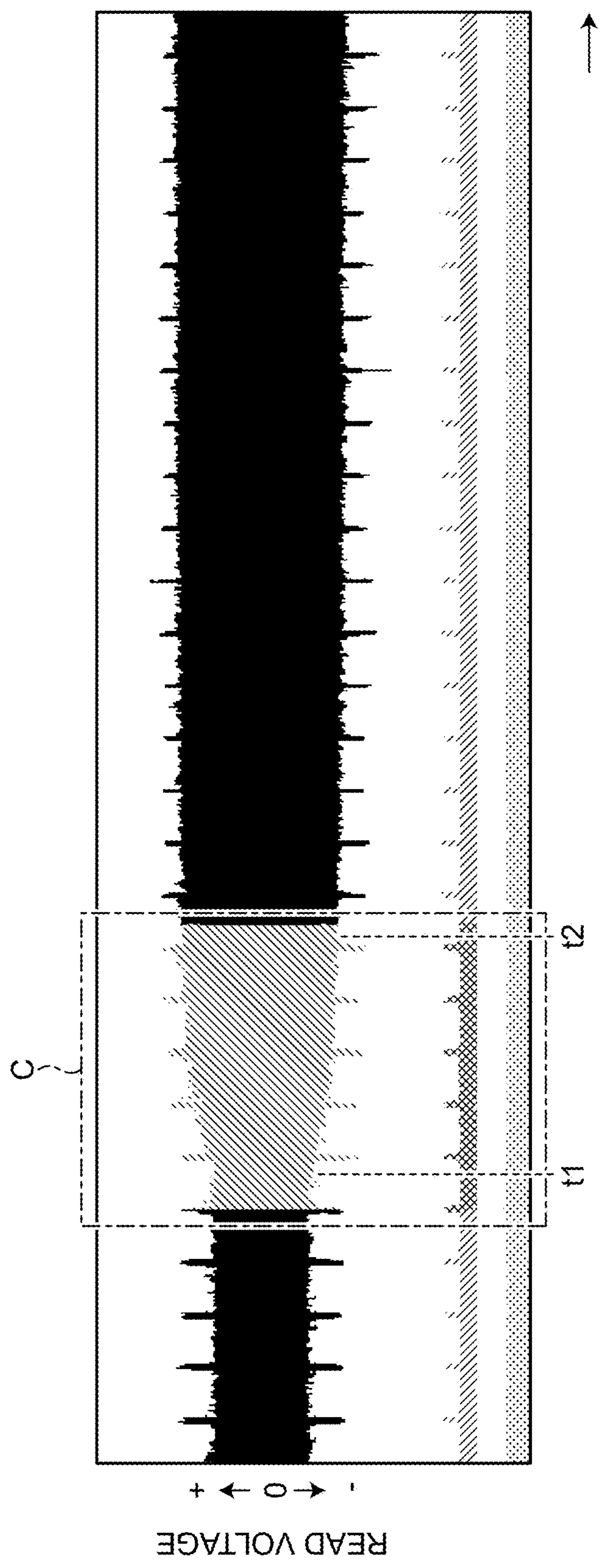
FIG. 6 is a waveform diagram illustrating a change in read voltage during heating of the head in the embodiment.
Figure 7:
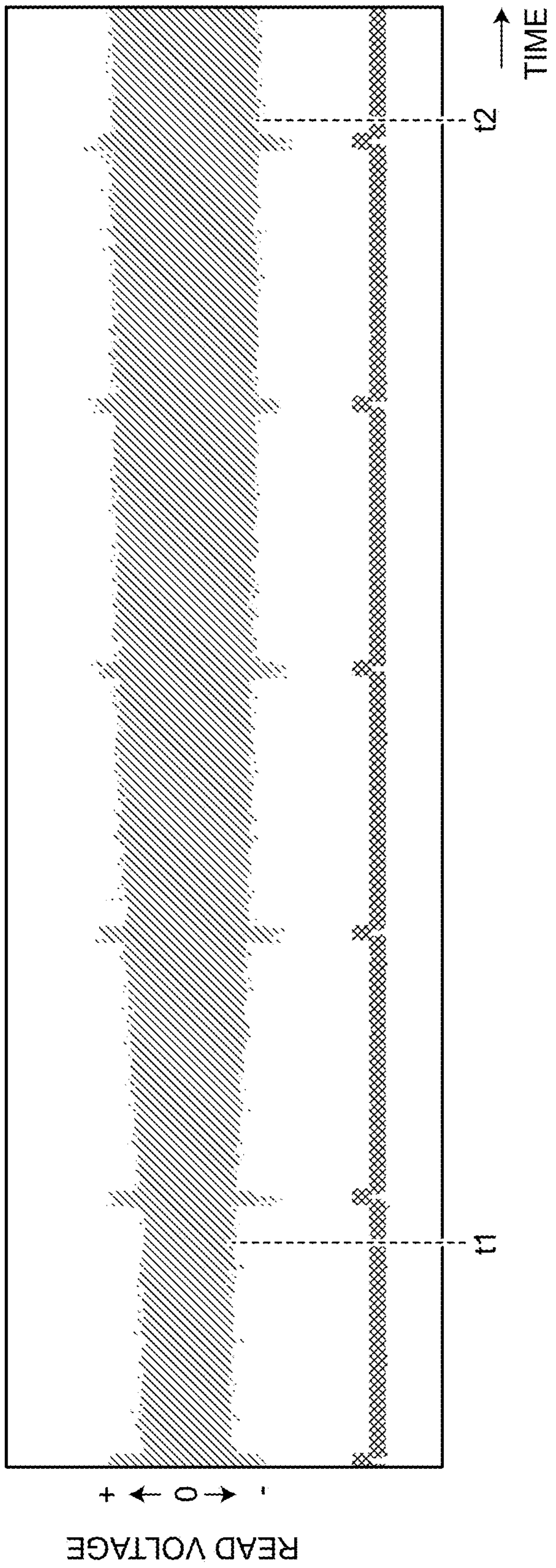
FIG. 7 is a waveform diagram illustrating a change in read voltage during heating of the head in the embodiment.

For example, when the amplitude of the read voltage gradually increases from the timing of the start of heater power application to the timing when the specified time is reached, as illustrated in FIGS. 6 and 7, the disk device 1 detects that no noise is present during the heating of the head 22. FIGS. 6 and 7 are waveform diagrams each illustrating a change in the read voltage during the heating of the head 22. In each of FIGS. 6 and 7, the vertical axis represents the read voltage and the horizontal axis represents the time. FIG. 7 is a waveform diagram in which a portion C of FIG. 6 is enlarged in the time direction.

In FIGS. 6 and 7, at timing t1, the heater power is applied and the thermal protrusion begins to gradually increase. In response to this, the amplitude of the read voltage begins to gradually increase.

At timing t2, when the specified time is reached, the thermal protrusion is kept at a specified value. Accordingly, the increase in the amplitude of the read voltage is completed, and the amplitude of the read voltage is kept approximately constant.

Here, in the read voltage waveform, upward and downward projections are seen periodically. This indicates that the amplitude of the read voltage temporarily increases at the timing of reading the servo information (servo timing).

Figure 8:
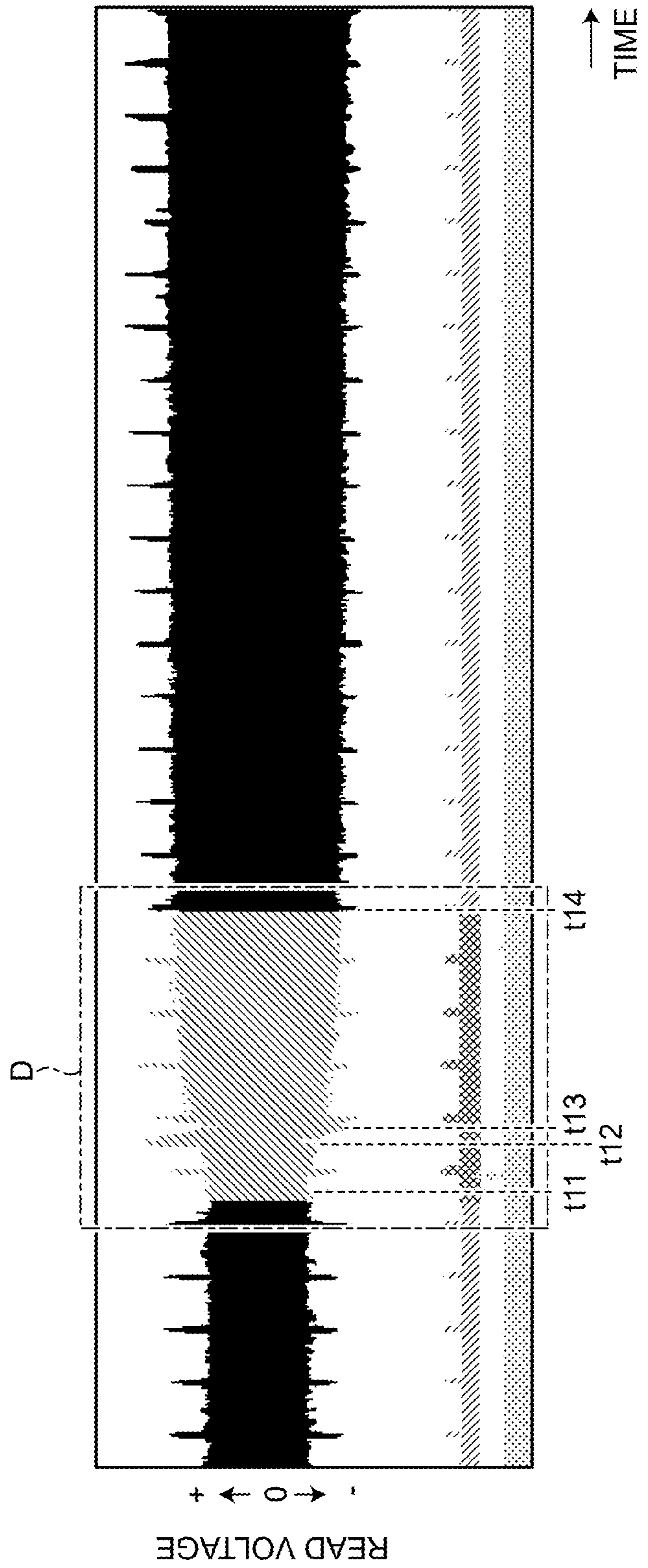
FIG. 8 is a waveform diagram illustrating a change in read voltage during heating of the head in the embodiment.
Figure 9:
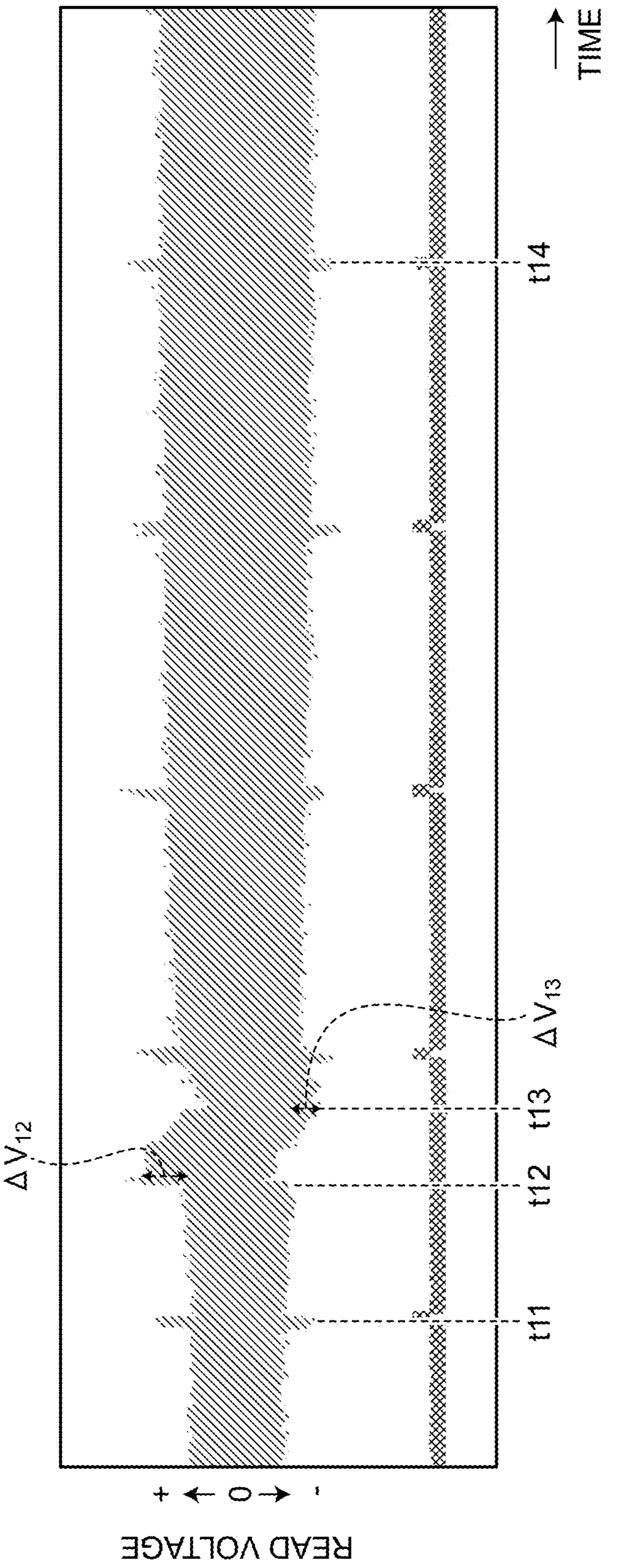
FIG. 9 is a waveform diagram illustrating a change in read voltage during heating of the head in the embodiment.

On the other hand, when the amplitude of the read voltage suddenly increases or decreases in the period from the timing of the start of heater power application to the specified time, as illustrated in FIGS. 8 and 9, the disk device 1 can detect that a noise is present during the heating of the head 22. FIG. 8 and FIG. 9 are waveform diagrams each illustrating a change in the read voltage during the heating of the head 22. In each of FIGS. 8 and 9, the vertical axis represents the read voltage, and the horizontal axis represents the time. FIG. 9 is a waveform diagram in which a portion D of FIG. 8 is enlarged in the time direction.

In FIGS. 8 and 9, at timing t11, the heater power is applied and the thermal protrusion begins to gradually increase. In response to this, the amplitude of the read voltage begins to gradually increase.

At timing t12, the read voltage reaches above the upper limit target value. The disk device 1 can detect a sudden output rise in the read voltage waveform as the upward excess amount $\Delta V_{12}$ of the read voltage value with respect to the upper limit target value exceeds the threshold TH2.

At timing t13, the read voltage reaches below the lower limit target value. The disk device 1 can detect a sudden output rise in the read voltage waveform as the downward excess amount $\Delta V_{13}$ of the read voltage value with respect to the lower limit target value exceeds the threshold TH2.

At timing t14, when the specified time is reached, the thermal protrusion is kept at a specified value. Accordingly, the increase in the amplitude of the read voltage is completed, and the amplitude of the read voltage is kept approximately constant.

Figure 10:
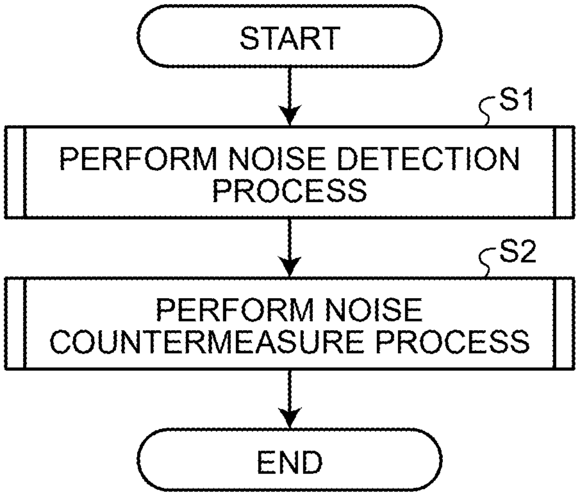
FIG. 10 is a flowchart illustrating an operation of the disk device according to the embodiment.

Next, with reference to FIG. 10, an explanation will be given of an operation outline of the disk device 1. FIG. 10 is a flowchart illustrating an operation of the disk device.

In the disk device 1, the controller 32 is started up, and performs a noise detection process (S1). In the noise detection process, the controller 32 detects a noise during the heating of the head 22 in response to signals read from the disk medium 11 by the read element RE immediately after an electric power is supplied to the heater HT in the head 22.

The controller 32 performs a noise countermeasure process (S2) in response to the result of the noise detection process (S1). The noise countermeasure process is a process that serves as a countermeasure to the noise. The noise countermeasure process may include a process of adjusting the read start timing during the heating of the head 22. The noise countermeasure process may include a process of selecting whether or not to use the head 22.

Here, the disk device 1 may perform the operation illustrated in FIG. 10 for each of all the read elements RE mounted thereon.

Figure 11:
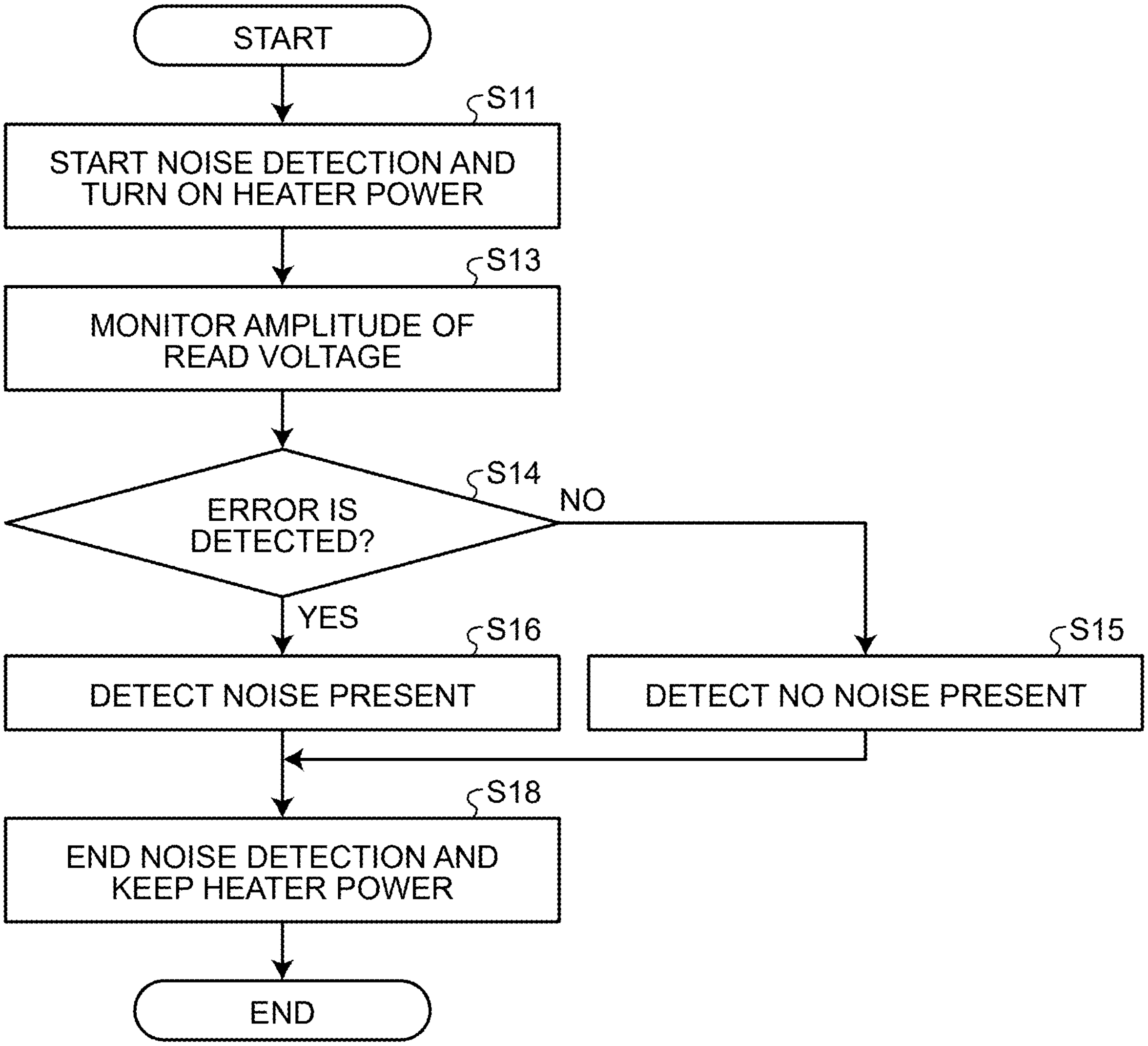
FIG. 11 is a flowchart illustrating a noise detection process in the embodiment.

Next, with reference to FIG. 11, an explanation will be given of the noise detection process (S1). FIG. 11 is a flowchart illustrating the noise detection process.

In the disk device 1, the controller 32 turns on the Defect Scan function to start the noise detection process, and also turns on the heater power to start the electric power supply to the heater HT (S11).

As the protrusion amount of the head 22 due to thermal expansion increases, the facing surface REa of the read element RE comes closer to the recording surface 11*a* of the disk medium 11, and the spacing ΔS decreases.

The controller 32 uses the Defect Scan function to monitor the amplitude of the read voltage by the read element RE (S13) and, on the basis of the monitoring results, determines whether an error is detected (S14).

The controller 32 obtains the read voltage from the read element RE via the head amplifier 24. When the read voltage reaches the upper limit target value at the timing at which the read voltage should reach the upper limit, the controller 32 determines that no error is detected (No in S14), and thus detects that no noise is present (S15).

When the shortage amount of the read voltage value with respect to the upper limit target value exceeds the threshold TH1 at the timing at which the read voltage should reach the upper limit, the controller 32 determines that an error is detected (Yes in S14) and thus detects that a noise is present (S16).

When the shortage amount of the read voltage value with respect to the lower limit target value exceeds the threshold TH1 at the timing at which the read voltage should reach the lower limit, the controller 32 determines that an error is detected (Yes in S14) and thus detects that a noise is present (S16).

When the excess amount of the read voltage value with respect to the upper limit target value exceeds the threshold TH2 at the timing at which the read voltage should reach the upper limit, the controller 32 determines that an error is detected (Yes in S14) and thus detects that a noise is present (S16).

When the excess amount of the read voltage value with respect to the lower limit target value exceeds the threshold TH2 at the timing at which the read voltage should reach the lower limit, the controller 32 determines that an error is detected (Yes in S14) and thus detects that a noise is present (S16).

When the fluctuation amount of the baseline BL with respect to the target value exceeds the threshold TH3 at the specified timing, the controller 32 determines that an error is detected (Yes in S14) and thus detects that a noise is present (S16).

The controller 32 ends the noise detection process and keeps the heater power to continue the electric power supply to the heater HT (S18).

Figure 12:
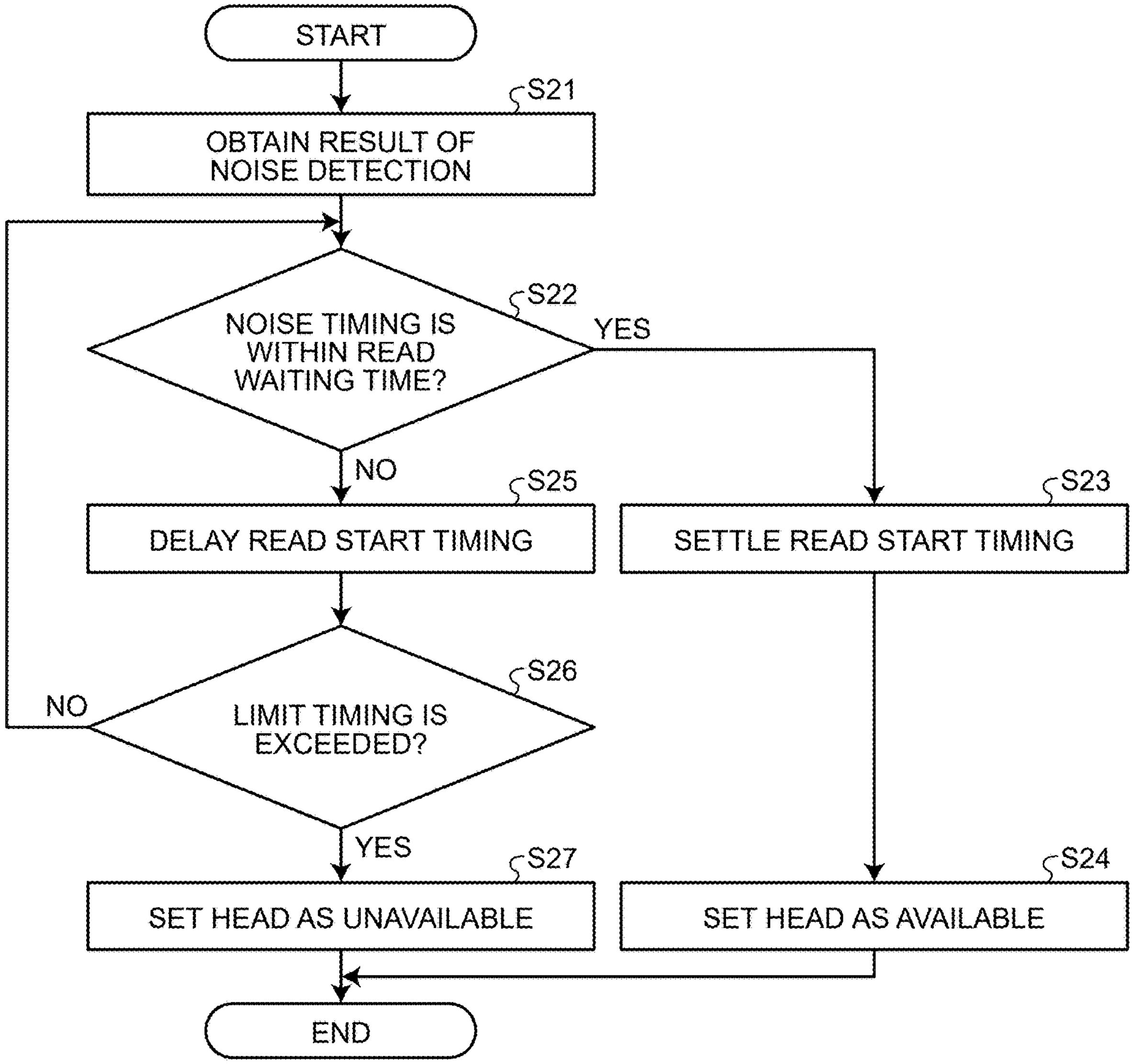
FIG. 12 is a flowchart illustrating a noise countermeasure process in the embodiment.

Next, with reference to FIG. 12, an explanation will be given of the noise countermeasure process (S2). FIG. 12 is a flowchart illustrating the noise countermeasure process.

The controller 32 obtains the result of the noise detection process (S1) (S21), and determines whether the timing (noise timing) NT at which the noise is generated is within the read waiting time (S22). The read waiting time is a time from when the power application to the heater HT starts to when the read gate opens and the read operation starts.

When the noise timing NT is within the read waiting time (Yes in S22), the controller 32 settles the timing for opening the read gate (read start timing) (S23), and sets the head 22, which is under this process, as available (S24).

When the noise timing NT is not within the read waiting time (No in S22), the controller 32 delays the read start timing by a predetermined amount (S25). The predetermined amount may be experimentally determined in advance as a delay amount suitable for adjusting the read start timing.

Figure 13:
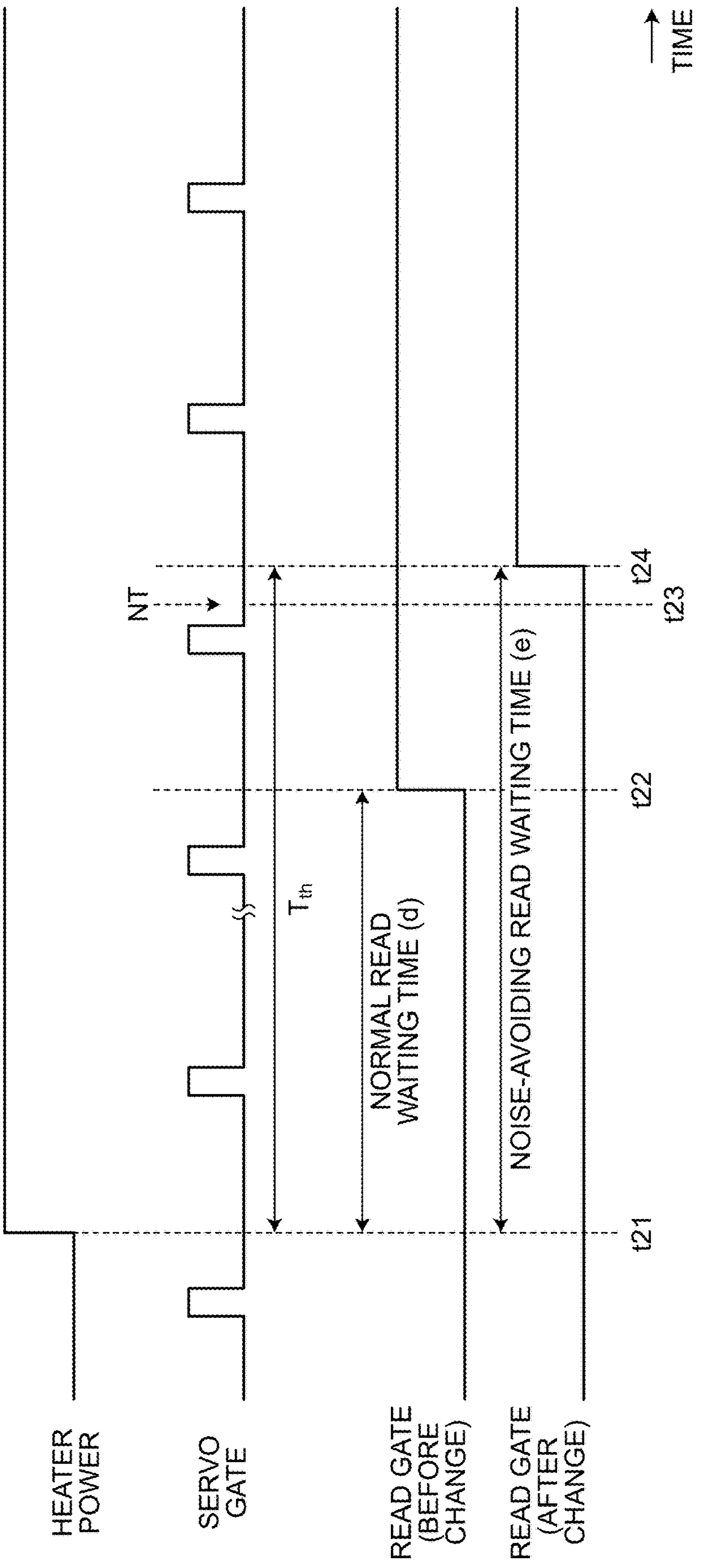
FIG. 13 is a waveform diagram illustrating noise timing in the embodiment.

For example, it is assumed that, where the normal read waiting time is a time from timing t21 to timing t22 illustrated in FIG. 13, the noise timing NT is timing t23 after the timing t22. FIG. 13 is a waveform diagram illustrating the noise timing NT. In this case, the controller 32 determines that the noise timing NT is not within the read waiting time, and delays the timing for opening the read gate by a predetermined amount from the timing t22.

Figure 14:
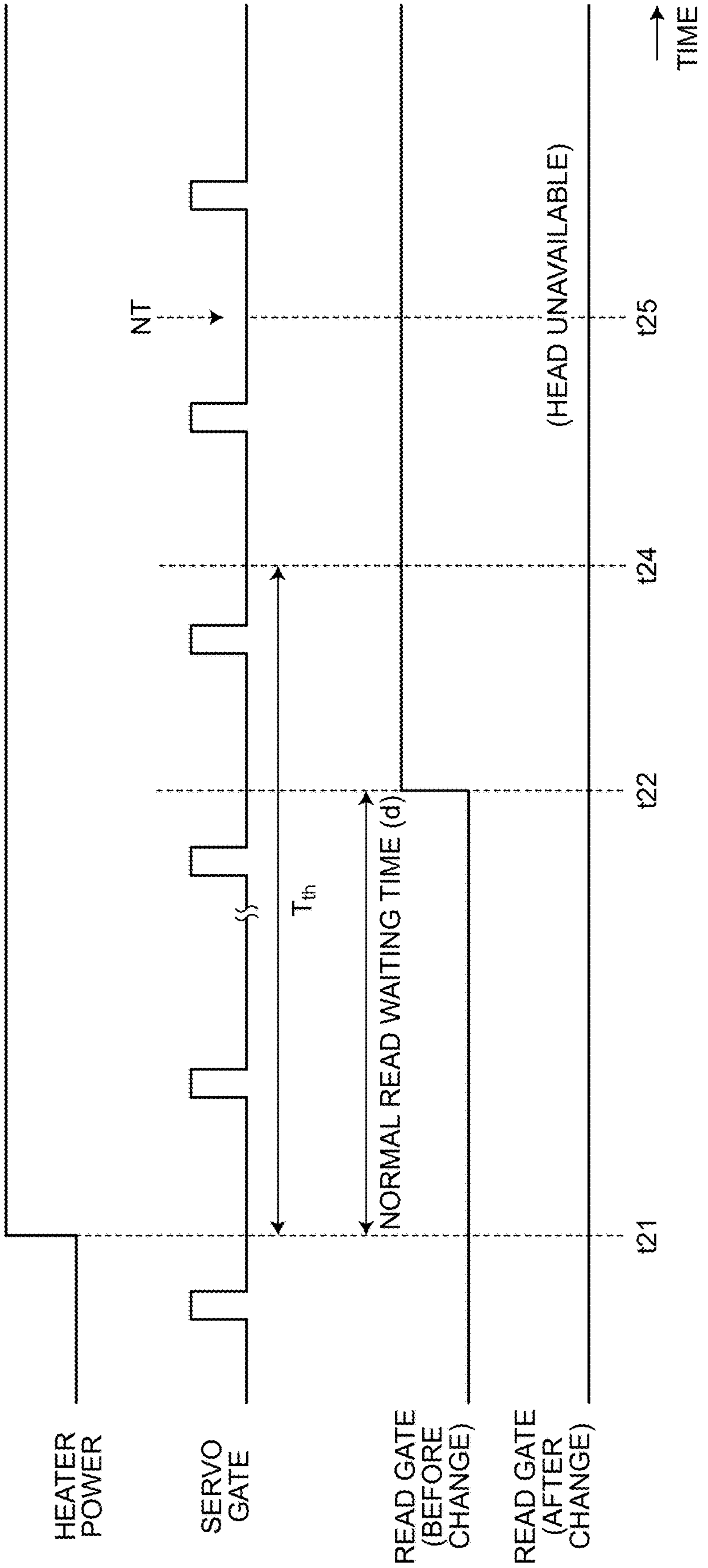
FIG. 14 is a waveform diagram illustrating noise timing in the embodiment.

Alternatively, it is assumed that, where the normal read waiting time is a time from timing t21 to timing t22 illustrated in FIG. 14, the noise timing NT is timing t25 after the timing t22. FIG. 14 is a waveform diagram illustrating the noise timing NT. In this case, the controller 32 determines that the noise timing NT is not within the read waiting time, and delays the timing for opening the read gate by a predetermined amount from t22.

Returning to FIG. 12, the controller 32 repeats the loop from S22 to S26 until the read start timing exceeds the limit of timing (limit timing) that allows the delay (No in S26).

In this repetition, when the noise timing comes to fall within the read waiting time (Yes in S22), the controller 32 settles the timing for opening the read gate (read start timing) (S23), and sets the head 22, which is under this process, as available (S24).

For example, FIG. 13 illustrates a case where the timing for opening the read gate is delayed until timing t24 at which the read waiting time reaches the limit $T_{th}$, and thereby the noise timing t23 comes to fall within the read waiting time. In light of this, the controller 32 settles the read start timing at the timing t24, and sets the head 22, which is under this process, as available.

When the read start timing exceeds the limit timing that allows the delay (Yes in S26), the controller 32 sets the head 22, which is under this process, as unavailable (S27) and ends the process.

For example, FIG. 14 illustrates a case where, even when the timing for opening the read gate is delayed until the timing t24 at which the read waiting time reaches the limit $T_{th}$, the noise timing t25 does not fall within the read waiting time. In light of this, the controller 32 fixes the read gate in the closed state and sets the head 22, which is under this process, as unavailable.

In FIGS. 13 and 14, for reference, the timing for reading the servo information (servo timing) is illustrated as the timing for opening the servo gate.

As described above, according to this embodiment, in the disk device 1, the controller 32 detects a noise during the heating of the head 22, in response to signals read from the disk medium 11 by the read element RE immediately after the power supply to the heater HT. The controller 32 performs a process that serves as a countermeasure to the noise in response to the noise detection result. For example, the controller 32 adjusts the read start timing during the heating of the head 22 in response to the noise detection result. This makes it possible to avoid the influence of the noise during the heating of the head 22, when the noise timing NT can be made to fall within the read waiting time. Alternatively, the controller 32 selects whether or not to use the head 22 in response to the noise detection result. This makes it possible to set the head 22 that generates a noise as unavailable and to avoid its use. Therefore, it is possible to properly perform the control of the flying height of the head 22 from the disk medium 11 during the read operation.

Figures 15A, 15B:
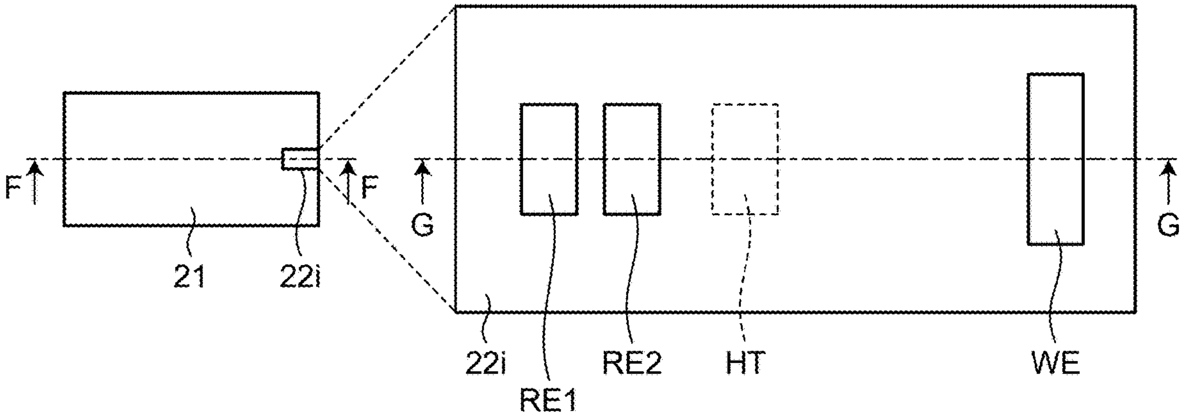
FIGS. 15A and 15B are plan views each illustrating a configuration of a head in a first modification of the embodiment.
Figures 16A, 16B:
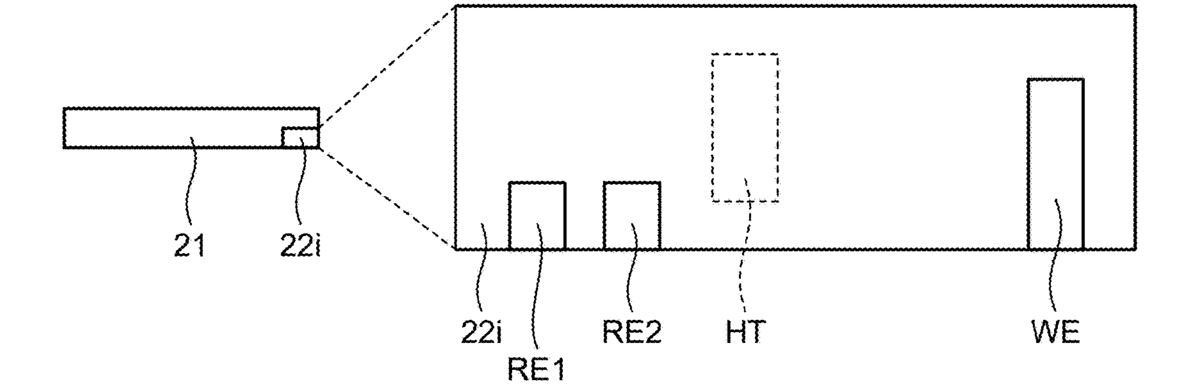
FIGS. 16A and 16B are sectional views each illustrating a configuration of the head in the first modification of the embodiment.

As a first modification of the embodiment, the head may be a head 22*i* formed of a Two Dimension Magnetic Recording (TDMR) head, as illustrated in FIGS. 15A, 15B, 16A, and 16B. FIGS. 15A and 15B are plan views each illustrating a configuration of the head 22*i*. FIG. 15A is a plan view illustrating the arrangement of the head 22*i* in the head slider 21. FIG. 15B is an enlarged plan view illustrating the configuration inside the head 22*i*. FIGS. 16A and 16B are sectional views each illustrating a configuration of the head 22*i*. FIG. 16A is a sectional view illustrating the arrangement of the head 22*i* on the head slider 21, which illustrates a cross section taken along a line F-F in FIG. 15A. FIG. 16B is an enlarged sectional view illustrating the configuration inside the head 22*i*, which illustrates a cross section taken along a line G-G in FIG. 15B.

As illustrated in FIGS. 15A, 15B, 16A, and 16B, the head 22*i* has a formation provided with a write element WE, a plurality of read elements RE1 and RE2, and a heater HT. The write element WE, plurality of read elements RE1 and RE2, and heater HT may be arranged along the longitudinal direction of the head 22*i*. The write element WE may be arranged closer to the tip side of the head 22*i* than the plurality of read elements RE1 and RE2.

The read element RE1 faces the recording surface 11*a* of the disk medium 11. It is assumed that the surface of the read element RE1 that faces the recording surface 11*a* will be referred to as facing surface RE1*a*. The read element RE1 reads changes in the magnetic field on the disk medium 11 as information, and thereby reads user data from the data areas DT of each track TR of the recording surface 11*a*, or thereby reads servo information from the servo areas SV of each track TR of the recording surface 11*a*.

Similarly, the read element RE2 faces the recording surface 11*a* of the disk medium 11. It is assumed that the surface of the read element RE2 that faces the recording surface 11*a* will be referred to as facing surface RE2*a*. The read element RE2 reads changes in the magnetic field on the disk medium 11 as information, and thereby reads user data from the data areas DT of each track TR of the recording surface 11*a*, or thereby reads servo information from the servo areas SV of each track TR of the recording surface 11*a*.

The heater HT may be provided near the read element RE1, or may be provided near the read element RE2. When energized, the heater HT can cause thermal expansion to the portions near the read elements RE1 and RE2.

Figure 17:
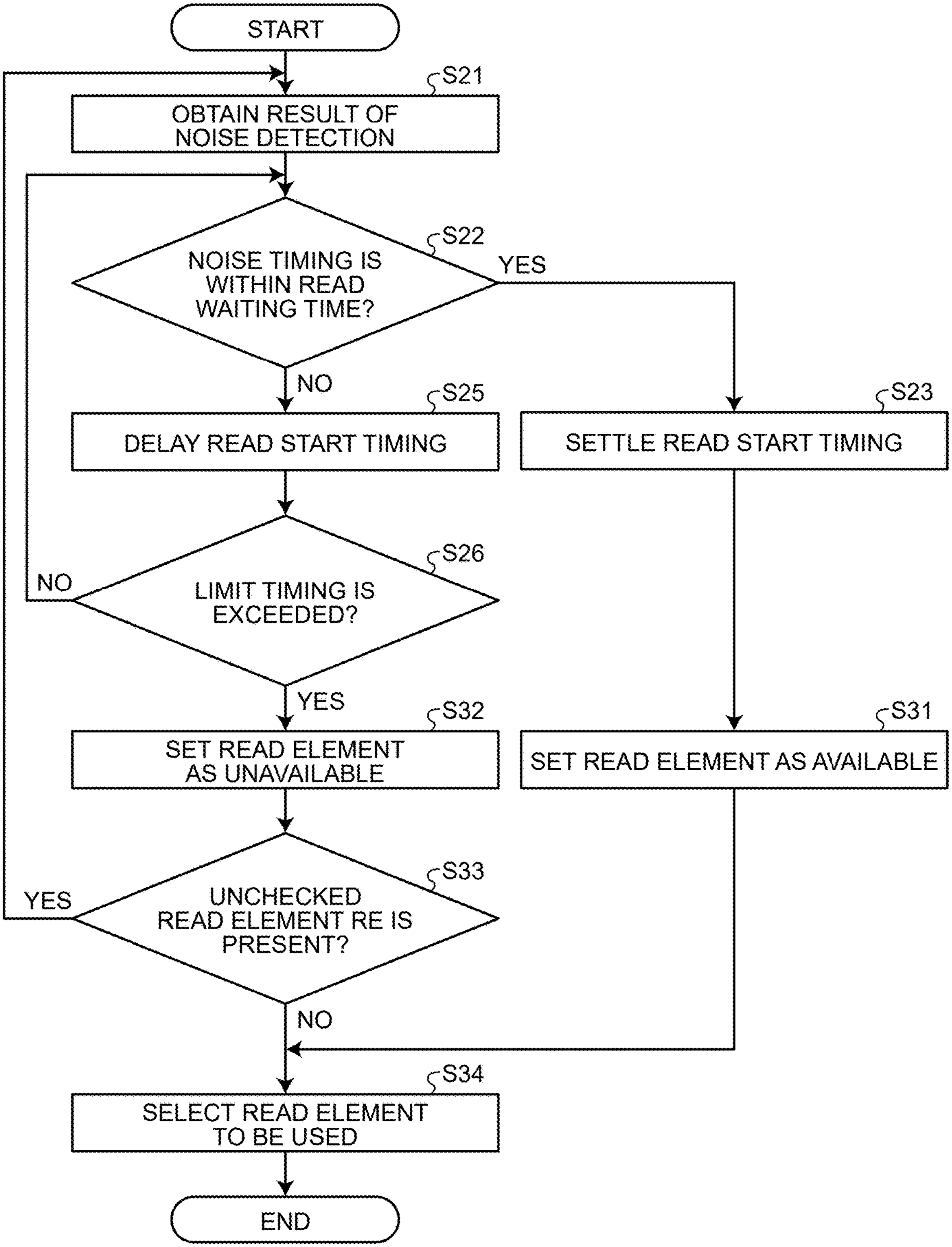
FIG. 17 is a flowchart illustrating a noise countermeasure process in the first modification of the embodiment.

Further, in the noise countermeasure process (S2), a process may be performed, which differs from that of the embodiment, in the following points, as illustrated in FIG. 17. FIG. 17 is a flowchart illustrating the noise countermeasure process in the first modification of the embodiment.

From the plurality of read elements RE1 and RE2, a read element RE to be processed is selected, and for the selected read element RE, the controller 32 performs S21 and S22 as in the embodiment. When the noise timing NT is within the read waiting time (Yes in S22), the controller 32 settles the timing for opening the read gate (read start timing) (S23), and sets the read element RE, which is under this process, as available (S31).

When the noise timing NT is not within the read waiting time (No in S22), the controller 32 delays the read start timing by a predetermined amount (S25). The predetermined amount can be experimentally determined in advance as a delay amount suitable for adjusting the read start timing. The controller 32 repeats the loop from S22 to S26 until the read start timing exceeds the limit of timing (limit timing) that allows the delay (No in S26).

In this repetition, when the noise timing comes to fall within the read waiting time (Yes in S22), the controller 32 settles the timing for opening the read gate (read start timing) (S23), and sets the read element RE, which is under this process, as available (S31).

When the read start timing exceeds the limit of timing that allows the delay (Yes in S26), the controller 32 sets the read element RE, which is under this process, as unavailable (S32), and confirms whether an unchecked read element RE is present (S33).

When an unchecked read element RE is present (Yes in S33), the controller 32 returns the process to S21.

When no unchecked read element RE is present (No in S33), the controller 32 sets the read element RE that is set as available among a plurality of read elements RE1 and RE2, as the read element RE to be used (S34).

When the read element RE1 is set as available and the read element RE2 is set as unavailable, the controller 32 sets the read element RE1 as the read element RE to be used.

When the read element RE1 is set as unavailable and the read element RE2 is set as available, the controller 32 sets the read element RE2 as the read element RE to be used.

When the read element RE1 is set as available and the read element RE2 is set as available, the controller 32 sets the read element RE1, which is primary, as the read element RE to be used.

When the read element RE1 is set as unavailable and the read element RE2 is set as unavailable, the controller 32 sets the head 22 as unavailable without selecting a read element to used.

Figure 18B:
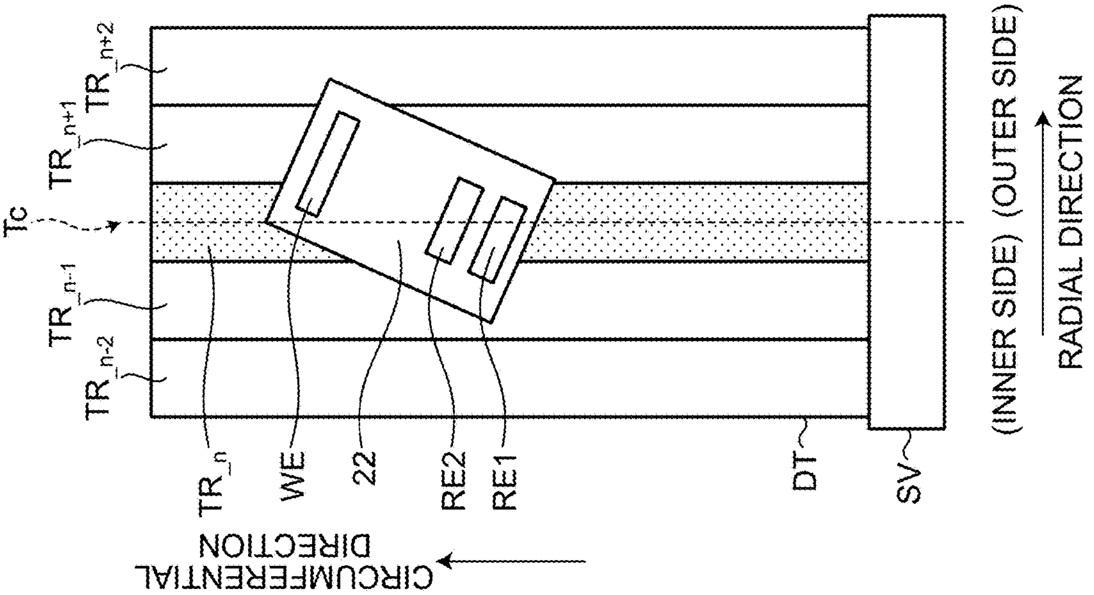
FIGS. 18A and 18B diagrams each illustrating offset setting of the head in the first modification of the embodiment.
Figure 18A:
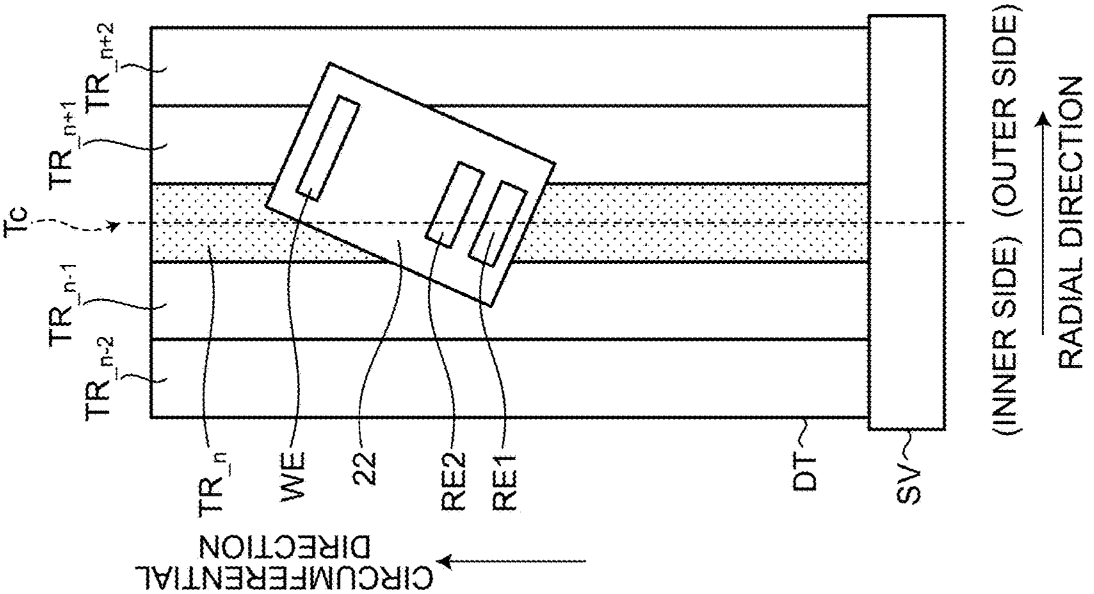

For example, when setting the read element RE1 as the read element RE to be used, the controller 32 sets a radial direction offset of the head 22 to be used for reading so that the center of the read element RE1 can be positioned at the track center RC of the target track TR during reading, as illustrated in FIG. 18A. FIGS. 18A and 18B are diagrams each illustrating offset setting of the head in the first modification of the embodiment.

Alternatively, when setting the read element RE2 as the read element RE to be used, the controller 32 sets a radial direction offset of the head 22 to be used for reading so that the center of read element RE2 can be positioned at the track center RC of the target track TR during reading, as illustrated in FIG. 18B.

In this way, when the head 22*i* is a TDMR head, the controller 32 can perform a process that serves as a countermeasure to the noise, in response to the noise detection result, while considering the TDMR head.

Figure 19:
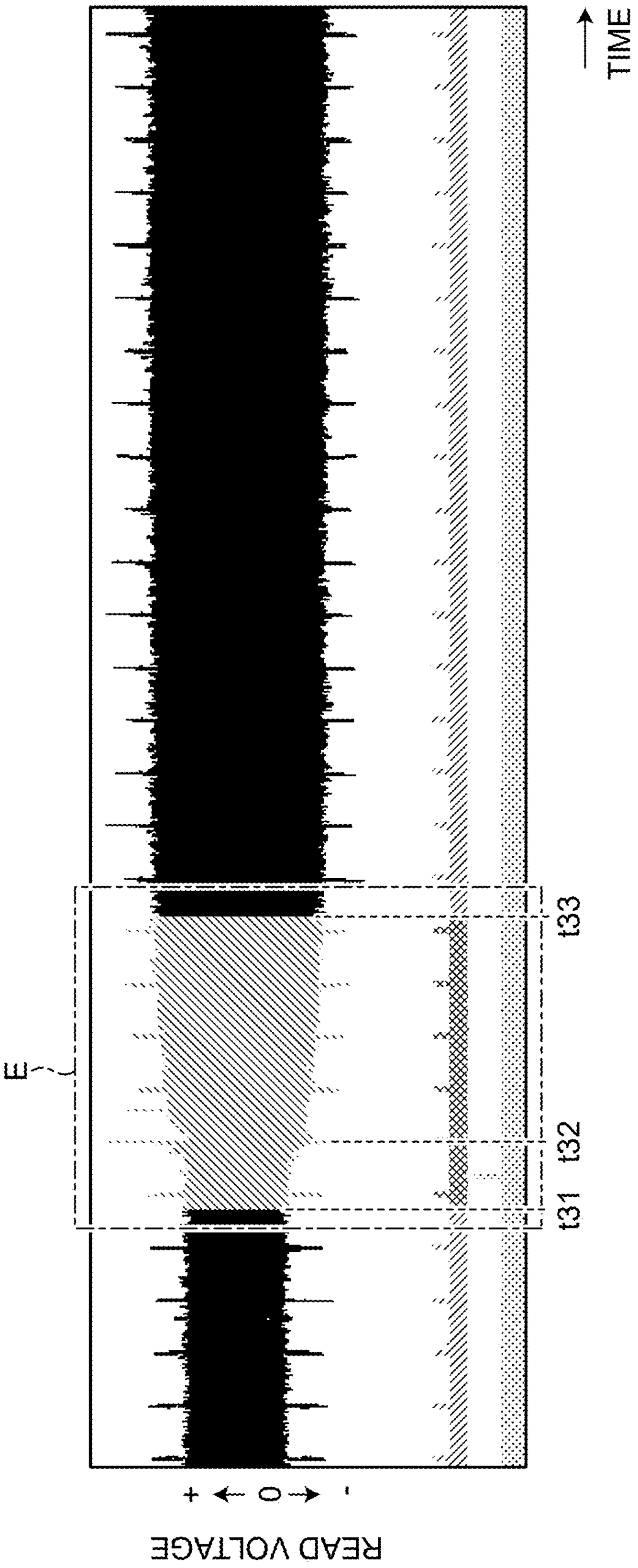
FIG. 19 is a waveform diagram illustrating a change in read voltage during heating of the head.
Figure 20:
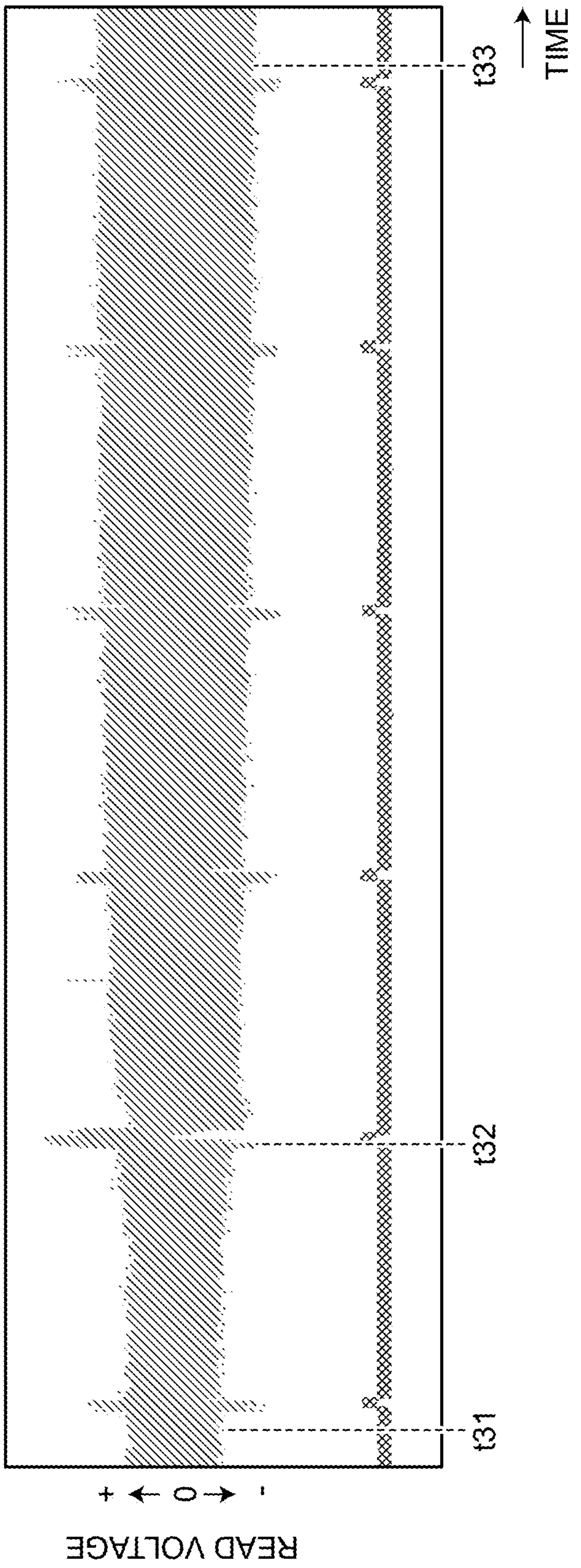
FIG. 20 is a waveform diagram illustrating a change in read voltage during heating of the head.

For example, there is a case where the noise timing NT overlaps with the servo timing, as illustrated in FIGS. 19 and 20. FIG. 19 and FIG. 20 are waveform diagrams each illustrating a change in the read voltage during the heating of the head 22. In FIGS. 19 and 20, the vertical axis represents the read voltage, and the horizontal axis represents the time. FIG. 20 is a waveform diagram in which a portion E of FIG. 19 is enlarged in the time direction.

In FIGS. 19 and 20, at timing t31, the heater power is applied and the thermal protrusion begins to gradually increase. In response to this, the amplitude of the read voltage begins to gradually increase.

At timing t32, the read voltage exceeds the upper limit target value, and overlaps with the servo timing. In this case, it is difficult to distinguish whether the excess of the read voltage value with respect to the upper limit target value is due to an abnormality or simply due to the servo information reading, and it is difficult to determine whether an error is present in the read voltage waveform.

In other words, from the timing of the start of heater power application t31 to timing t33 at which the specified time is reached, it is difficult to detect a noise overlapping with the servo timing by the Defect Scan function.

In this respect, as a second modification of the embodiment, the disk device 1 may utilize the fact that, in a case where a noise is present depending on the heater power application and a noise is included in the servo information being read, it is observed that an abnormality occurs in the servo demodulation and the positioning accuracy synchronized with the pulse frequency is greatly changed.

Figure 21:
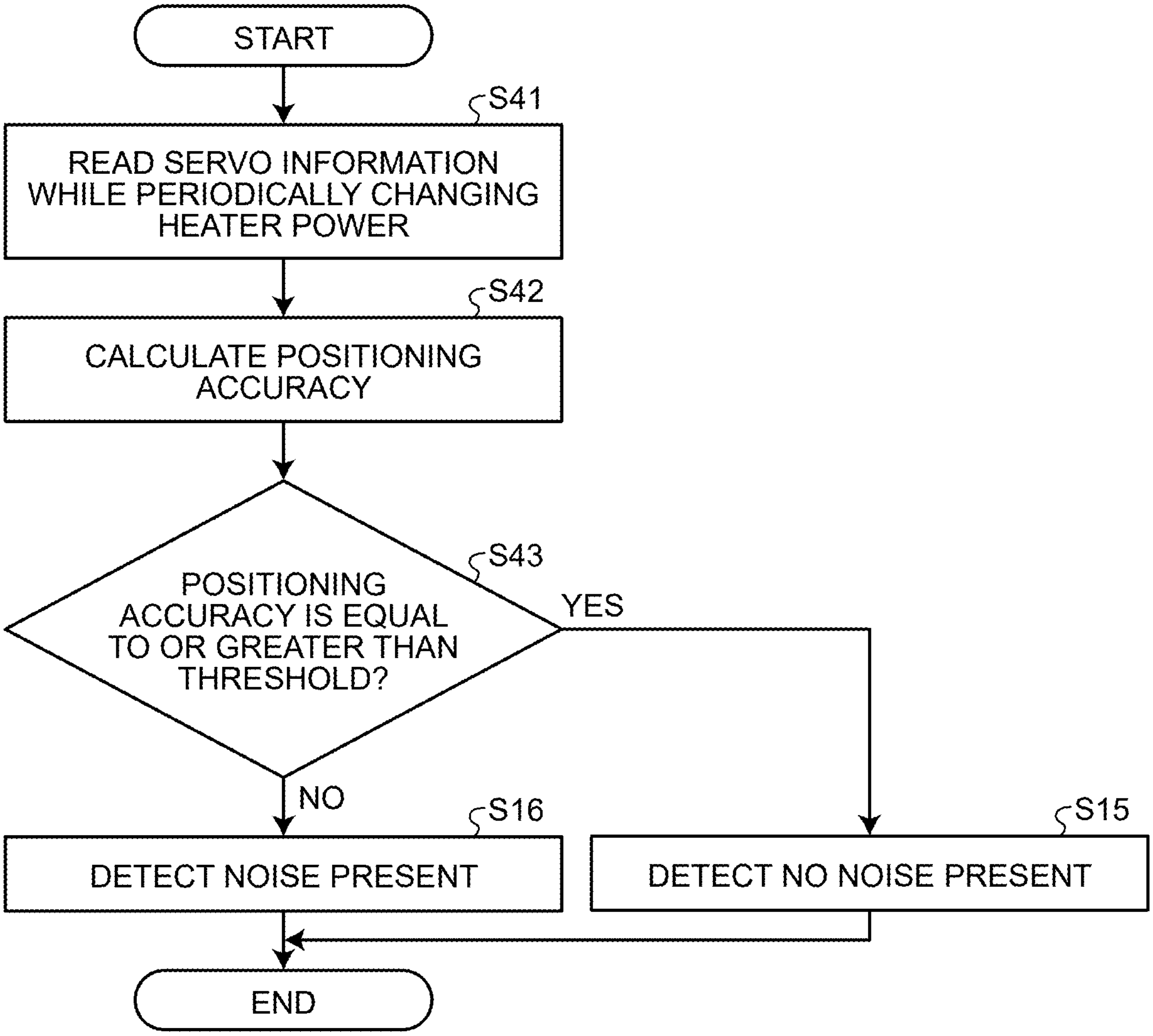
FIG. 21 is a flowchart illustrating a noise detection process in a second modification of the embodiment.

The noise detection process (S1) may be performed by observing a change in the positioning accuracy of the head 22 when the heater power is periodically changed, as illustrated in FIG. 21. FIG. 21 is a flowchart illustrating the noise detection process in the second modification of the embodiment.

In the disk device 1, the controller 32 reads the servo information while periodically changing the heater power (S41). The controller 32 reads the servo information by the read element RE at the servo timing, while repeating an operation of changing the heater power in a pulsed manner at intervals substantially equal to a multiple of the servo intervals.

Figure 22:
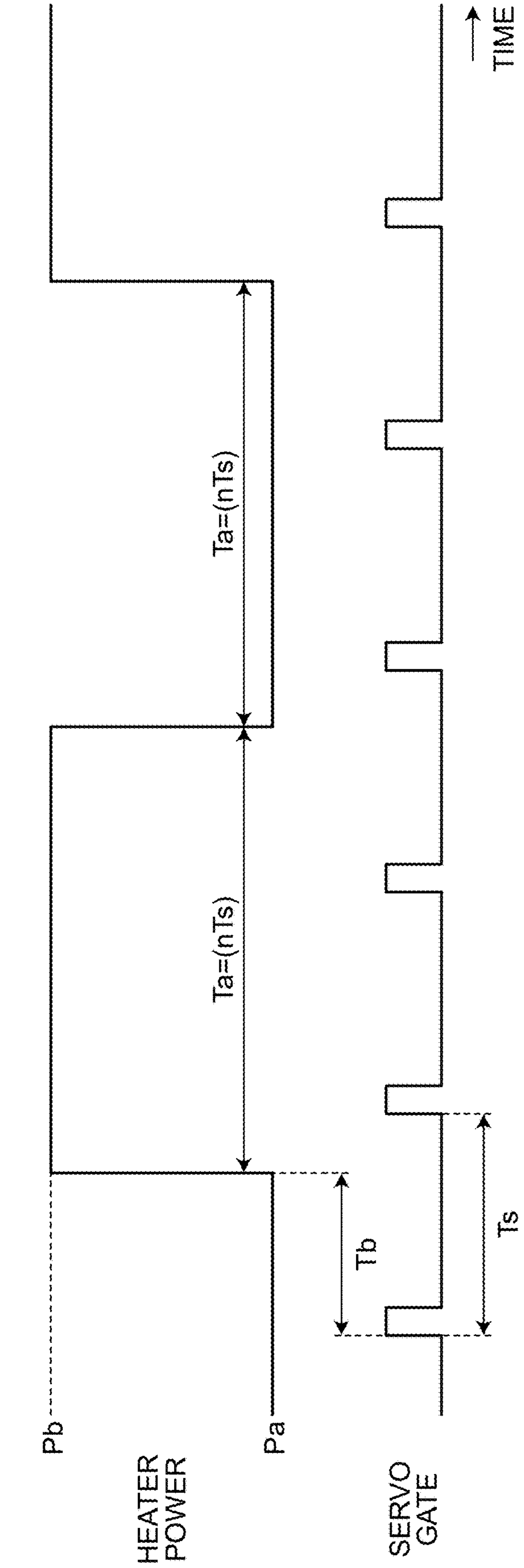
FIG. 22 is a waveform diagram illustrating an operation of a disk device according to the second modification of the embodiment.

For example, the controller 32 may change the heater power with a pulse shape as illustrated in FIG. 22. FIG. 22 is a waveform diagram illustrating an operation of the disk device 1 according to the second modification of the embodiment. The pulse shape of the heater power can be defined by a lower limit heater power Pa, an upper limit heater power Pb, pulse intervals Ta, and a shift time Tb from the servo start to the heater power change timing. Each pulse interval Ta is n-times each servo interval Ts. This "n" is an arbitrary integer equal to or greater than 2.

The controller 32 calculates the positioning accuracy synchronized with the pulse frequency, in response to the read servo information (S42). The controller 32 demodulates the current position of the head 22 by using the read servo information, and obtains the deviation between the demodulated current position and the target position of the head 22. The controller 32 Fourier-converts the deviation and extracts the component synchronized with the pulse frequency. The controller 32 uses the extracted component to calculate the positioning accuracy synchronized with the pulse frequency.

The controller 32 may obtain the positioning accuracy for each heater power and obtain the relationship between the heater power and a change in the positioning accuracy. The controller 32 may obtain the positioning accuracy by multiplying the reciprocal of the deviation (off-track amount) between the demodulated current position and the target position of the head 22 by the track width.

For example, since the heater power with which a noise is generated and the timing at which a noise is generated after the heater power application differ depending on the read element RE, the controller 32 performs confirmation under a plurality of conditions, for the lower limit heater power Pa, upper limit heater power Pb, and pulse intervals Ta, as illustrated in FIG. 22. When the upper limit heater power Pb is set too large, the facing surface REa of the read element RE and the recording surface 11*a* of the disk medium 11 make the spacing ΔS therebetween almost 0, and come into contact with each other. This causes a change in the positioning accuracy to occur due to disturbance caused by the contact. In the disk device 1, the heater power that brings about such contact is measured for the adjustment of the spacing ΔS during a test process in general. The upper limit heater power Pb may be preset in the controller 32 as a power that is lower by a certain amount than the heater power corresponding to the contact.

Figure 23:
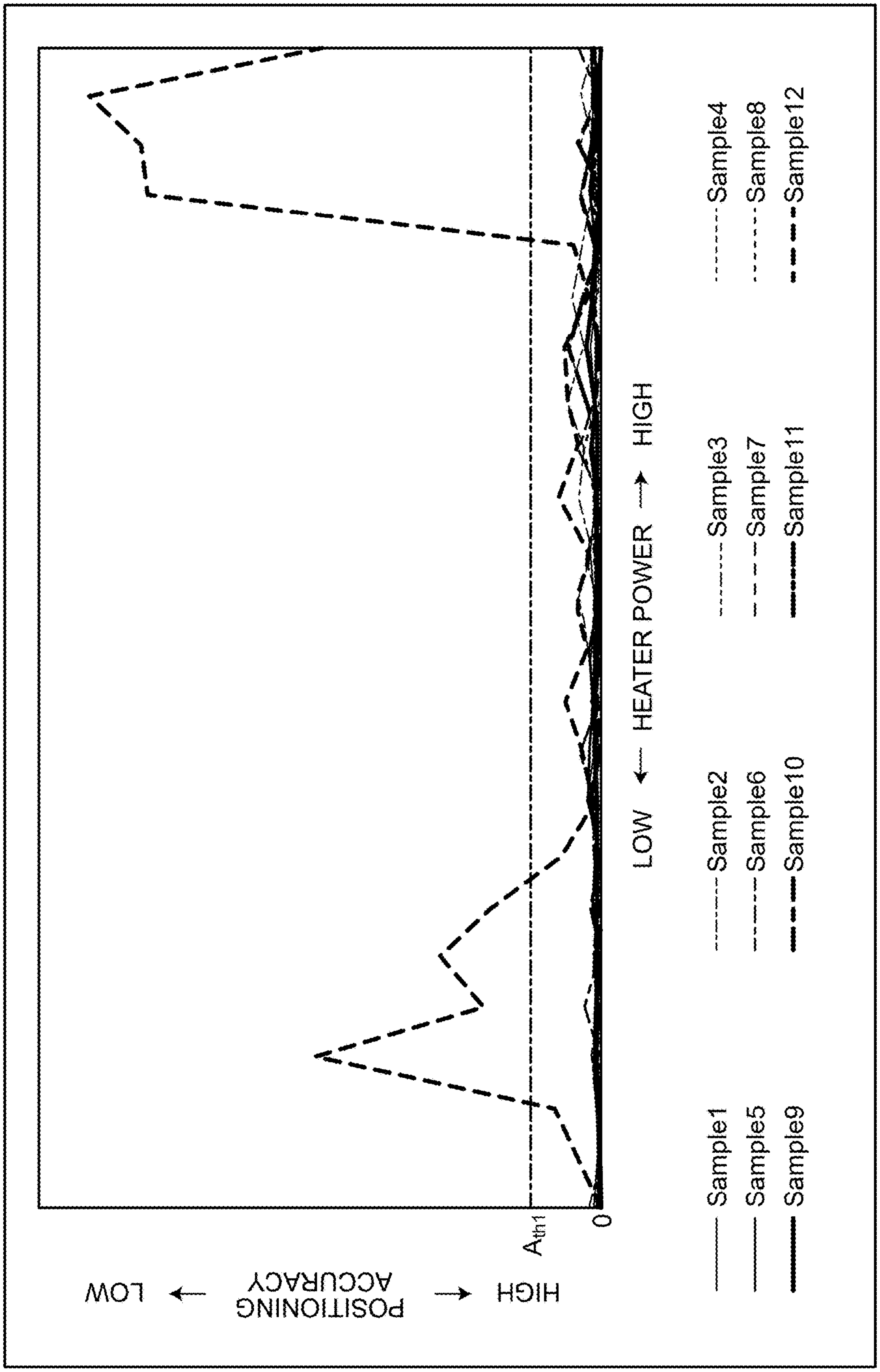
FIG. 23 is a diagram illustrating changes in positioning accuracy due to the change in heater power in the second modification of the embodiment.

By obtaining the positioning accuracy for each heater power, the controller 32 can obtain the relationship between the heater power and a change in the positioning accuracy as illustrated in FIG. 23. FIG. 23 is a diagram illustrating changes in the positioning accuracy due to the change in the heater power in the second modification of the embodiment. FIG. 23 illustrates the relationship between the heater power and the changes in the positioning accuracy for Samples 1 to 12, which correspond to 12 heads 22.

When the positioning accuracy is equal to or greater than the threshold $A_{th1}$ (Yes in S43), the controller 32 detects that no noise is present (S15).

In the case of FIG. 23, for Samples 1 to 11, the positioning accuracy is equal to or greater than the threshold $A_{th1}$ in the entire check object range of the heater power, and it is detected that no noise is present.

When the positioning accuracy is less than the threshold $A_{th1}$ (No in S43), the controller 32 detects that a noise is present (S16).

In the case of FIG. 23, for Sample 12, the positioning accuracy is less than the threshold $A_{th1}$ in both of the high power side and the low power side of the check object range of the heater power, and it is detected that a noise is present.

In this way, in the disk device 1, the controller 32 can detect a noise during the heating of the head 22 by using a change in the positioning accuracy during periodic changes of the heater power instead of the Defect Scan function.

Alternatively, as a third modification of the embodiment, the disk device 1 may utilize the fact that, in a case where a noise is included in the servo information being read, it is observed that an abnormality occurs in the servo demodulation and the detection accuracy of the servo mark OK intervals synchronized with the pulse frequency is greatly changed.

Figure 24:
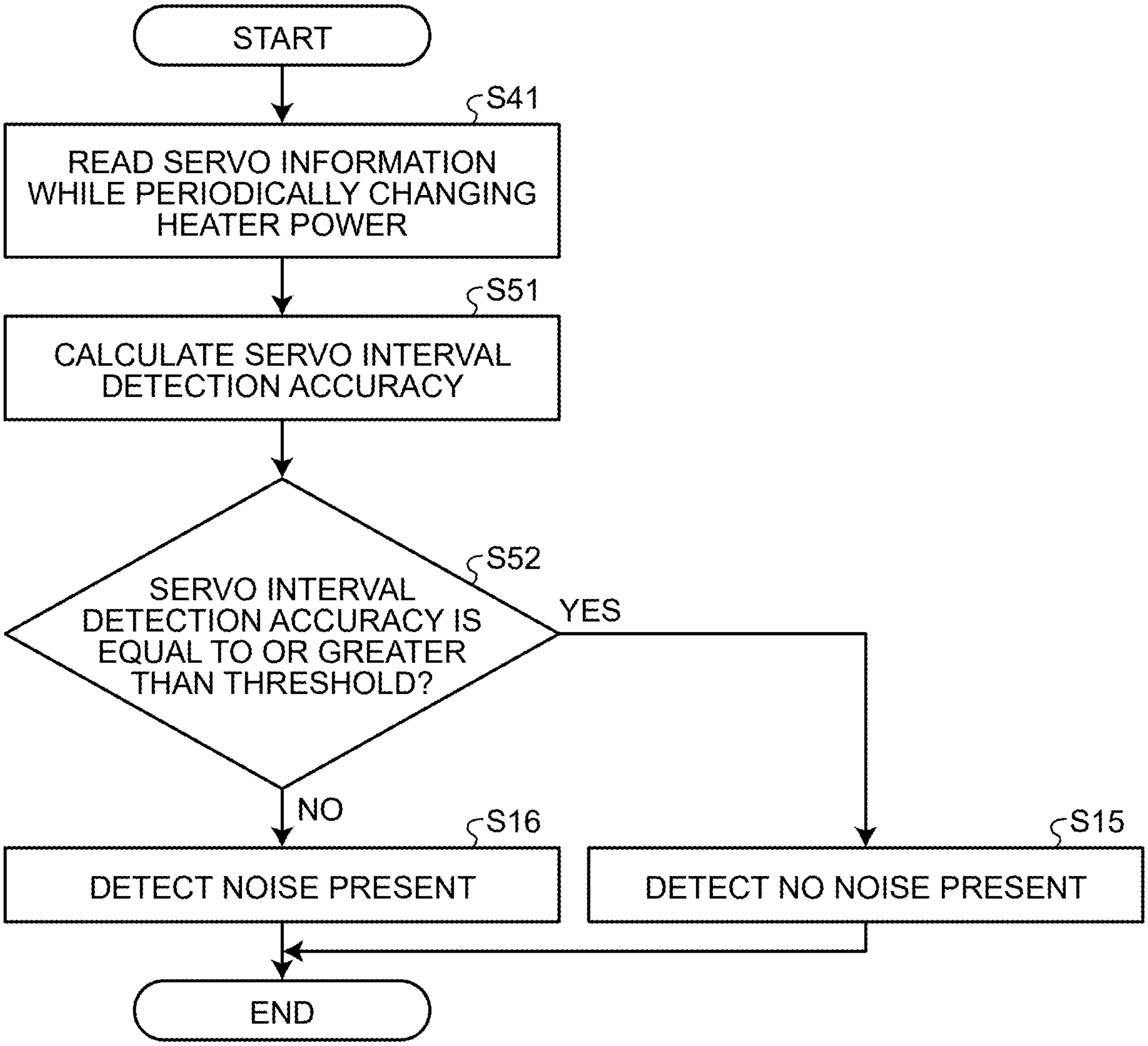
FIG. 24 is a flowchart illustrating a noise detection process in a third modification of the embodiment.

The noise detection process (S1) may be performed by observing a change in the servo interval detection accuracy when the heater power is periodically changed, as illustrated in FIG. 24. FIG. 24 is a flowchart illustrating the noise detection process in the third modification of the embodiment.

In disk device 1, the controller 32 reads the servo information while periodically changing the heater power (S41). The controller 32 reads the servo information by the read element RE at the servo timing, while repeating an operation of changing the heater power in a pulsed manner at intervals substantially equal to a multiple of the servo intervals.

The controller 32 calculates the servo interval detection accuracy synchronized with the pulse frequency in response to the read servo information (S51). The controller 32 demodulates the servo mark OK intervals by using the read servo information, and obtains the deviation between the demodulated intervals and the default servo intervals. The controller 32 Fourier-converts the deviation and extracts the component synchronized with the pulse frequency. The controller 32 uses the extracted component to calculate the servo interval detection accuracy synchronized with the pulse frequency.

The controller 32 may obtain the servo interval detection accuracy for each heater power, and obtain the relationship between the heater power and a change in the servo interval detection accuracy. The controller 32 may obtain the servo interval detection accuracy by multiplying the reciprocal of the deviation between the demodulated intervals and the default servo intervals by the default servo intervals.

Figure 25:
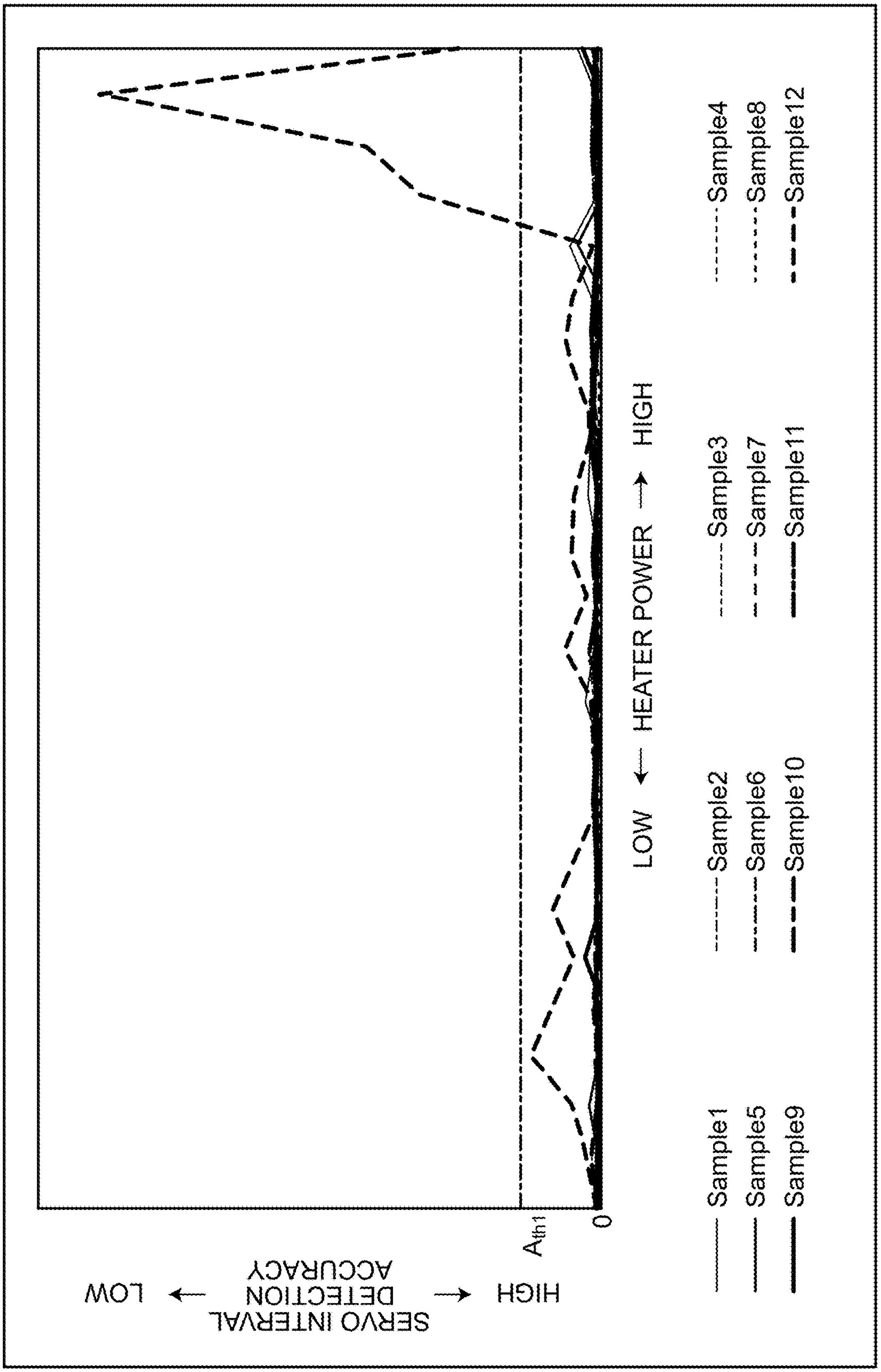
FIG. 25 is a diagram illustrating changes in servo interval detection accuracy due to the change in heater power in the third modification of the embodiment.

The controller 32 can obtain the relationship between the heater power and a change in the servo interval detection accuracy as illustrated in FIG. 25, by obtaining the servo interval detection accuracy for each heater power. FIG. 25 is a diagram illustrating changes in the servo interval detection accuracy due to the change in the heater power in the third modification of the embodiment. FIG. 25 illustrates the relationship between the heater power and changes in the servo interval detection accuracy for Samples 1 to 12, which correspond to 12 heads 22.

When the servo interval detection accuracy is equal to or greater than the threshold $A_{th2}$ (Yes in S52), the controller 32 detects that no noise is present (S15).

In the case of FIG. 25, for Samples 1 to 11, the servo interval detection accuracy is equal to or greater than the threshold $A_{th2}$ in the entire check object range of the heater power, and it is detected that no noise is present.

When the servo interval detection accuracy is less than the threshold $A_{th2}$ (No in S52), the controller 32 detects that a noise is present (S16).

In the case of FIG. 25, for Sample 12, the servo interval detection accuracy is less than the threshold $A_{th2}$ in the high power side of the check object range of the heater power, and it is detected that a noise is present.

In this way, in the disk device 1, the controller 32 can detect a noise during the heating of the head 22 by using a change in the servo interval detection accuracy during periodic changes of the heater power instead of the Defect Scan function.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A disk device comprising:
a disk medium that includes a recording surface;
a head that includes a first read element facing the recording surface, and a heater; and
a controller configured to detect that a first noise is present, in response to a fact that level of a signal read from the disk medium by the first read element suddenly changes, when starting supply of an electric power to the heater and then gradually increasing the electric power thus supplied.

2. The disk device according to claim 1, wherein
the controller is configured to detect that the first noise is not present, in response to a fact that level of a signal read from the disk medium by the first read element gradually changes, when starting supply of an electric power to the heater and then gradually increasing the electric power thus supplied.

3. The disk device according to claim 1, wherein
the controller is configured to adjust read start timing during heating of the head, in response to a detection result of the first noise.

4. The disk device according to claim 3, wherein
the controller is configured to delay the read start timing, when the first noise is not detected within read waiting time from the starting supply of an electric power to the heater to the read start timing.

5. The disk device according to claim 4, wherein
the controller is configured to settle the read start timing, when the first noise is detected within read waiting time from the starting supply of an electric power to the heater to the read start timing.

6. The disk device according to claim 1, wherein
the controller is configured to select whether or not to use the head, in response to a detection result of the first noise.

7. The disk device according to claim 4, wherein
the controller is configured to set the head as available, when the first noise is detected within read waiting time from the starting supply of an electric power to the heater to the read start timing.

8. The disk device according to claim 7, wherein
the controller is configured to set the head as unavailable, when the first noise is not detected within read waiting time from the starting supply of an electric power to the heater to the read start timing, and delaying the read start timing entails an excess from limit timing.

9. The disk device according to claim 1, wherein
the head further includes a second read element facing the recording surface,
the controller is configured to further detect a second noise during heating of the head, in response to a signal read from the disk medium by the second read element when starting supply of an electric power to the heater, and
the controller is configured to select a read element to be used from the first read element and the second read element, in response to a detection result of the first noise and a detection result of the second noise.

10. The disk device according to claim 9, wherein
the controller is configured to set the first read element as the read element to be used, when the first read element is set as available and the second read element is set as unavailable.

11. The disk device according to claim 9, wherein
the controller is configured to set the second read element as the read element to be used, when the first read element is set as unavailable and the second read element is set as available.

12. The disk device according to claim 9, wherein
the controller is configured to set the first read element, which is primary, as the read element to be used, when the first read element is set as available and the second read element is set as available.

13. The disk device according to claim 9, wherein
the controller is configured to set the head as unavailable, without selecting the read element to be used, when the first read element is set as unavailable and the second read element is set as unavailable.

14. The disk device according to claim 1, wherein the disk medium includes a plurality of concentric tracks, each of the plurality of tracks includes a plurality of servo areas at substantially equal intervals in a circumferential direction, and the controller is configured to, while changing an electric power supplied to the heater at a first frequency corresponding to servo intervals, obtain a change in positioning accuracy corresponding to the first frequency during heating of the head, in response to servo information read from the servo areas of the disk medium by the first read element, and to detect the first noise in response to the change in positioning accuracy corresponding to the first frequency.

15. The disk device according to claim 14, wherein the controller is configured to obtain a change in positioning accuracy corresponding to the first frequency, for each of a plurality of supply electric powers different from each other, and to detect the first noise in response to the change in positioning accuracy corresponding to the first frequency.

16. The disk device according to claim 15, wherein the controller is configured to detect that the first noise is present, when, among the plurality of supply electric powers, there is a supply electric power whose positioning accuracy corresponding to the first frequency exceeds a threshold.

17. The disk device according to claim 1, wherein the disk medium includes a plurality of concentric tracks, each of the plurality of tracks includes a plurality of servo areas at substantially equal intervals in a circumferential direction, and the controller is configured to obtain a change in servo interval detection accuracy during heating of the head, in response to servo information read from the servo areas of the disk medium by the first read element while changing an electric power supplied to the heater at a first frequency, and to detect the first noise in response to the change in servo interval detection accuracy.

18. A disk device control method, in disk device including a disk medium that includes a recording surface, and a head that includes a first read element facing the recording surface, and a heater, the method comprising:

detecting that a first noise is present, in response to a fact that level of a signal read from the disk medium by the first read element suddenly changes, when starting supply of an electric power to the heater and then gradually increasing the electric power thus supplied; and performing a process that serves as a countermeasure to the first noise, in response to a result of the detecting.

* * * * *